(12) United States Patent
Yoshida et al.

(10) Patent No.: US 7,044,455 B2
(45) Date of Patent: May 16, 2006

(54) FLUID-FILLED VIBRATION DAMPING DEVICE

(75) Inventors: Takashi Yoshida, Kasugai (JP); Mitsuhiro Ogawa, Komaki (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 10/128,414

(22) Filed: Apr. 22, 2002

(65) Prior Publication Data
US 2002/0158389 A1 Oct. 31, 2002

(30) Foreign Application Priority Data
Apr. 27, 2001 (JP) .............................. 2001-133563
Feb. 8, 2002 (JP) .............................. 2002-033034

(51) Int. Cl.
*F16F 5/00* (2006.01)
(52) U.S. Cl. ........................... 267/140.13; 267/140.11; 267/140.12
(58) Field of Classification Search ........... 267/140.11, 267/140.12, 140.13, 140.2, 140.3, 141.1, 267/141.2; 248/562, 636, 560
See application file for complete search history.

(56) References Cited

U.S. PATENT DOCUMENTS

| | | | | |
|---|---|---|---|---|
| 4,805,884 A | * | 2/1989 | Jordens et al. | 267/140.14 |
| 5,005,810 A | * | 4/1991 | Sawada et al. | 267/140.13 |
| 5,123,634 A | * | 6/1992 | Schwerdt | 267/140.12 |
| 5,356,121 A | * | 10/1994 | Ikeda | 267/140.12 |
| 5,690,320 A | * | 11/1997 | Kanda | 267/140.12 |
| 5,711,513 A | * | 1/1998 | Bretaudeau et al. | 267/140.12 |
| 5,927,698 A | * | 7/1999 | Miyoshi et al. | 267/140.13 |
| 6,015,141 A | * | 1/2000 | Rudolf et al. | 267/140.12 |
| 6,443,438 B1 | * | 9/2002 | Satori et al. | 267/140.13 |
| 2002/0000688 A1 | | 1/2002 | Simuttis et al. | 267/140.13 |

FOREIGN PATENT DOCUMENTS

| | | | |
|---|---|---|---|
| DE | 3618767 A1 | * | 12/1987 |
| JP | 61-262244 | | 11/1986 |
| JP | 63-61533 | | 11/1988 |
| JP | 3144134 A | * | 6/1991 |
| JP | 6129476 A | * | 5/1994 |

* cited by examiner

Primary Examiner—James McClellan
Assistant Examiner—Mariano Sy
(74) Attorney, Agent, or Firm—Beyer Weaver & Thomas LLP

(57) ABSTRACT

A fluid-filled vibration-damping device including a first and a second mounting members elastically connected by an elastic body such that the first mounting member is located on the side of one open end of a cylindrical portion of the second mounting member. The elastic body partially defines a primary fluid chamber formed in the cylindrical portion of the second mounting member and held in fluid communication with an auxiliary fluid chamber through a first orifice passage, and includes a pair of working fluid chambers held in fluid communication through a second orifice passage. Each working fluid chamber is partially defined by an axially outer elastic wall portion and an axially inner elastic wall portion whose spring constant in a radial direction is larger than that of the axially outer wall portion.

20 Claims, 15 Drawing Sheets

FLUID-FILLED VIBRATION DAMPING DEVICE

The disclosures of Japanese Patent Application No. 2001-133563 filed on Apr. 27, 2001 and No. 2002-033034 filed on Feb. 8, 2002, each including the specification, drawings and abstract, are incorporated herein by reference in their entirety.

BACKGROUND OF THE INVENTION

1. Field of the Invention

The present invention relates generally to fluid-filled vibration damping devices exhibiting vibration damping effect on the basis of flows of non-compressible fluid filled therein. More particularly, the present invention is concerned with a fluid-filled vibration damping device that is capable of exhibiting an excellent vibration damping effect with respect to vibrations applied thereto in two directions, i.e., in an axial direction parallel to a central axis of the damping device and in a radial direction perpendicular to the central axis of the damping device, on the basis of the flows of the non-compressible fluid, and that is suitably adoptable as an engine mount for automotive vehicles, for example.

2. Description of the Related Art

A fluid-filled vibration damping device adapted to exhibit a vibration damping effect on the basis of flows of a non-compressible fluid filled therein is known as one type of a vibration damping device interposed between two members of a vibration system for elastically connecting the two members, or for mounting one of the two members of the vibration system on the other member in a vibration damping fashion. JP-B-63-61533 and JP-A-61-262244 disclose known examples of such a fluid-filled vibration damping device capable of exhibiting desired vibration damping effect with the help of the flows of the non-compressible fluid, with respect to input vibrations applied thereto in an axial direction parallel to a central axis of the damping device and a radial direction perpendicular to the central axis of the damping device.

The disclosed a fluid-filled vibration damping device includes (a) a first mounting member having a support shaft portion; (b) a second mounting member having a cylindrical portion, the first and second mounting members being disposed relative to each other such that the first mounting member is located on the side of one of axially opposite open ends of the cylindrical portion of the second mounting member with its support shaft portion axially inserted into the cylindrical portion of the second mounting member; (c) an elastic body elastically connecting the supporting shaft portion of the first mounting member and the cylindrical portion of the second mounting member so that an opening of one of axially opposite ends of the cylindrical portion of the second mounting member is fluid-tightly closed by the elastic body; (d) a primary fluid chamber partially defined by the elastic body and formed within the cylindrical portion of the second mounting member, while being filled with the non compressible fluid; (e) an auxiliary fluid chamber filled with the non-compressible fluid whose pressure changes relative to a pressure of the fluid within the primary fluid chamber upon application of an axial vibrational load between the first and second mounting members; (f) a first orifice passage for fluid communication between the primary and auxiliary fluid chambers; (g) a pair of working fluid chambers formed at respective circumferential portions of the elastic body opposed to each other in a diametric direction of the elastic body with the supporting shaft portion of the first mounting member interposed therebetween; and (h) a second orifice passage for fluid communication between the pair of working fluid chambers. When the axial vibrational load is applied between the first and second mounting members, the thus constructed vibration-damping device is able to exhibit vibration damping effect with respect to the axial vibrational load on the basis of flows or resonance of the fluid through the first orifice passage between the primary and auxiliary fluid chambers. When a vibrational load is applied to the vibration-damping device in the radial direction perpendicular to the central axis of the device (herein after referred to as a "radial vibrational load"), the vibration-damping device is able to exhibit a desired vibration damping effect on the basis of flows or resonance of the fluid flowing through the second orifice passage between the pair of working fluid chambers.

The disclosed fluid-filled vibration damping device may be adopted for use in a front-engine front-drive type automotive vehicle (hereinafter referred to as a "FF type vehicle as an engine mount for supporting an engine mounted transversely in the vehicle, for example. In this case, the fluid-filled vibration damping device is installed in position with its first mounting member being fixed to the power unit and with its second mounting member being fixed to the body, for thereby mounting the power unit on the body of the vehicle in a vibration damping fashion. Thus, the fluid-filled vibration-damping device is capable of exhibiting the desired vibration damping effects with respect to input vibrations in the vertical and longitudinal direction of the vehicle on the basis of the above-described resonance of the fluid.

For a vibration damping support of a power unit of the transversely mounted engine on the FF-type vehicle in an efficient and effective manner, the power unit is desirably supported in a vibration damping fashion by two engine mounts located on and fixed to laterally opposite sides of the power unit, at respective points located on a primary inertia axis of the power unit. Namely, it is preferable to support the power unit by the two engine mounts in an uncoupled vibration damping fashion or structure.

Recent tendency to reduce the volume of an engine room in an attempt to increase a volume of a passenger's room, or due to an increase in the number of various kinds of auxiliary devices housed in the engine room, inevitably causes a restriction or reduction of the space for installation of the engine mount. In particular, the transversely mounted engine of the FF-type vehicle is more likely to be placed on a tire housing of the vehicle due to its arrangement. Accordingly, the fixing point of the first mounting member of each of the engine mounts is located in a higher position of the power unit, so that a support position in which the engine mount supports the power unit in a vibration damping fashion is prone to be located above the primary inertia axis of the power unit in the vertical direction. For the above reasons, the conventional vibration-damping device used as the engine mount for supporting the power unit of the transversely mounted engine of FF-type vehicle is insufficient to exhibit a desired vibration damping characteristics and fails to exhibit an excellent vibration damping effect.

For installation on the tire housing, the engine mount is generally arranged such that a central axis of the first and second mounting members extend approximately in the vertical direction. The first mounting member is disposed on the side of the axially or vertically upper end of the second mounting member, and the axially or vertically lower end of the second mounting member is fixedly connected to the body of the vehicle. Therefore, a vibration input position to which a vibrational load of the power unit is applied to the vibration-damping device through the first mounting member, is prone to be spaced apart from the fixing portion in which the second mounting member is connected to the body of the vehicle in the vertically upward direction with a relatively large vertical distance therebetween. This may cause an increase in a moment acting to the fixing portion of the second mounting member to the body of the vehicle, when the vibrational load is applied to the engine mount through the first mounting member, thus deteriorating strength, bonding strength and durability of the first and second mounting members in their fixing portions to members of the vehicle.

SUMMARY OF THE INVENTION

It is therefore one object of this invention to provide a fluid-filled vibration damping device, which is novel in construction, and which is capable of decreasing or minimizing a force acting on the fixing portions of the first and second mounting members to a vibrative member and a supporting member, while being adoptable as an engine mount for an automotive vehicle, and capable of locating its support position for supporting a power unit in a vibration damping fashion at a relatively lower position in an axial direction thereof.

The above and/or other objects may be attained according to at least one of the following the principle of the invention. The following preferred forms of the invention may be adopted at any possible optional combinations. It is to be understood that the present invention is not limited to the following forms or combinations of these forms, but may otherwise be recognized based on the thought of the present invention that described in the whole specification and drawings or that may be recognized by those skilled in the art in the light of the present disclosure in its entirety.

According to the principle of the present invention, a fluid-filled vibration damping device comprises (a) a first mounting member having a support shaft portion; (b) a second mounting member having a cylindrical portion, the second mounting member is disposed relative to the first mounting member such that the first mounting member is located on the side of an opening portion of one of axially opposite ends of the cylindrical portion of the second mounting member with an axial spacing therebetween and with its supporting shaft portion axially inserted into the cylindrical portion of the second mounting member; (c) an elastic body elastically connecting the support shaft portion of the first mounting member and the cylindrical portion of the second mounting member so that the opening portion of the one of axially opposite ends of the cylindrical portion of the second mounting member is fluid-tightly closed by the elastic body; (d) a primary fluid chamber formed in the cylindrical portion of the second mounting member and located axially inwardly of the first mounting member, while being partially defined by the elastic body and filled with a non-compressible fluid; (e) an auxiliary fluid chamber filled with the non-compressible fluid whose pressure varies relative to a pressure of the fluid filling the primary fluid chamber upon application of an axial vibrational load between the first mounting member and the second mounting member; (f) a first orifice passage for fluid communication between the primary and auxiliary fluid chambers; (g) a pair of working fluid chambers formed at respective circumferential portions of the elastic body that are opposed to each other in a diametric direction of the elastic body, so as to extend circumferentially with a circumferential length smaller than a half of a circumference of the elastic body, the pair of working fluid chambers being filled with the non-compressible fluid; and (h) a second orifice passage for fluid communication between the pair of working fluid chambers, wherein each of the pair of working fluid chambers formed in the elastic body is partially defined by an axially outer elastic wall portion and an axially inner elastic wall portion whose spring constant in a radial direction perpendicular to the axial direction of the cylindrical portion of the second mounting member is larger than a spring constant of the axially outer elastic wall portion in the radial direction.

In the fluid-filled vibration damping device constructed according to the principle of the invention, the elastic body is substantially divided into two parts, i.e., the axially inner and outer elastic wall portions by the working fluid chambers interposed between the axially inner and outer elastic wall portions in the axial direction. Further, the axially inner elastic wall portion has the spring constant in the radial direction that is made larger than the spring constant in the radial direction of the axially outer elastic wall portion. This arrangement makes it possible to place an elastic support center of the fluid-filled vibration-damping device against an input vibrational load in the diametric direction in which the pair of working fluid chambers are opposed to each other, on the protruding end of the support shaft portion in the axial direction of the first and second mounting members.

Therefore, an elastic support center of the elastic body for supporting the first mounting member can be located in the axially inward portion of the second mounting member, while the first mounting member is fixed to the power unit or the like at its fixing portion that protrudes axially outwardly from the cylindrical portion of the second mounting member. When the vibration-damping device of the invention is adopted as an engine mount for use in the FF-type, for example, the engine mount is able to locate its elastic support position for elastically supporting the power unit, sufficiently away from the fixing portion of the first mounting member to power unit in the vertically downward direction, while the fixing portion protrudes vertically upwardly from the cylindrical portion of the second mounting member. This makes it possible to locate the elastic support position of the engine mount for elastically supporting the power unit close to the principle inertia axis of the power unit, thereby reducing a moment acting on the fixing portions in which the first and second mounting members are fixed to the power unit and the body of the vehicle, resulting in improved strength or durability of the members which are fixed together at the above-described fixing portions.

It should be appreciated that the first and second mounting members of the fluid-filled vibration damping device of this mode of the invention may be fixed to vibrative members and supporting members, or other members, with a variety of fixing structure and at a variety of fixing positions, without any limitation. For instance, the first mounting member and the second mounting member may be advantageously fixed to two members of a vibration systems, such that the first mounting member has its fixing portion that protrudes axially outwardly from the opening of one of axially opposite ends of the cylindrical portion of the second mounting member and fixed to one of the two members of the vibration system, and the second mounting member is fixed at its other end to the other member of the vibration system directly or via a suitable bracket. This arrangement makes it easy to fix the first and second mounting members to the members connected together in the vibration damping fashion.

The fluid-filled vibration damping device according to the first aspect of the invention may have a variety of structures, without any limitations, for permitting the axially inner elastic wall portion of each working fluid chamber to have the spring constant in the radial direction that is larger than that of the axially outer elastic wall portion of the working fluid chamber. Preferable examples of these structures of the fluid-filled vibration damping device include: (a) the axially inner elastic wall portion having an axial wall thickness that is larger than that of the axially outer elastic wall portion; (b) the axially inner elastic wall portion having a free length between the first and second mounting members that is smaller than that of the axially outer wall portion; and (c) the axially inner elastic wall portion inclining with respect to the axial direction with an angle smaller than that of the axially outer elastic wall portion, which may be adopted alone or in combination.

According to a first preferred form of the invention, the elastic body is bonded to the support shaft portion of the first mounting member in a process of vulcanization of a rubber material for forming the elastic body, and has a pair of pockets formed at respective circumferential portions thereof that are opposed to each other in a diametric direction thereof with the support shaft portion of the first mounting member interposed therebetween. The vibration damping device further comprises: a cylindrical metallic sleeve having a pair of windows opposed to each other in a diametric direction thereof and being bonded on an outer circumferential surface of said elastic body in the process of vulcanization so that the pockets of the elastic body are open in an outer circumferential surface of the metallic sleeve through the windows, respectively. The metallic sleeve is press-fitted into a bore of the cylindrical portion of the second mounting member so that openings of the pair of pockets are fluid-tightly closed by the cylindrical portion of the second mounting member to thereby provide the pair of working fluid chambers. The use of the metallic sleeve constructed as described above may effectively assure a fluid-tight sealing between fixing surfaces of the cylindrical portion of the second mounting member and the metallic sleeve member, which are held in contact with each other, making it possible to form the primary fluid chamber and the pair of the working fluid chamber independently of one another with high fluid tight sealing and with ease. Thus, the vibration-damping device of this preferred form of the invention is capable of exhibiting a high vibration damping effect with improved stability.

According to a first advantageous feature of the first preferred form of the invention, the metallic sleeve includes a large-diameter annular portion and a small diameter annular portion located on axially opposite sides of a shoulder portion formed at an axially intermediate portion thereof. The large-diameter annular portion is bonded in the process of vulcanization to an outer circumferential surface of the axially outer elastic wall portions of the working fluid chambers, and the small-diameter annular portion is bonded in the process of vulcanization to an outer circumferential surface of the axially inner elastic wall portions of the working fluid chambers. The vibration damping device further comprises a generally cylindrical orifice member disposed radially outwardly on the small-diameter annular portion of the metallic sleeve such that one of axially opposite end portions of the generally cylindrical orifice member is forcedly held by and between the small-diameter annular portion and the cylindrical portion of the second mounting member, and an other one of the axially opposite end portions of the generally cylindrical orifice member extends to the working fluid chambers along an inner circumferential surface of the cylindrical portion of the second mounting member so as to at least partially define the second orifice passage for fluid communication between the pair of working fluid chambers. The use of the orifice member constructed as described above makes it possible to form the second orifice passage for the fluid communication between the pair of working fluid chambers with an enhanced degree of freedom in tuning the length or cross sectional area of the second orifice passage. In addition, the presence of the orifice passage disposed radially outwardly of the axially inner elastic wall portion of the elastic body make a free length of the axially inner elastic wall portions of the working fluid chambers have a free length that is smaller than that of the axially outer elastic wall portion of the working fluid chambers, thus permitting the axially inner elastic wall portion to have the spring stiffness in its radial direction that is larger than that of the axially outer elastic wall portion, while preventing an adverse effect on a fluid-tightness of the working fluid chambers, and needing no specific members or processes. It should be appreciated that the term "generally cylindrical orifice member" should be interpreted to include an orifice member extending in its axial direction with an annular cross sectional shape, an orifice member extending in its axial direction with an arcuate cross sectional shape having a circumferential length larger than a half of an entire circumference of a circle of the same radius, and the like.

According to a second preferred form of the invention, the auxiliary fluid chamber may be effectively formed according to a first example, namely by disposing a partition member at an axially intermediate portion of the cylindrical wall portion of the second mounting member to form the primary fluid chamber one of axially opposite sides thereof and the auxiliary fluid chamber on an other one of axially opposite sides thereof, and the auxiliary fluid chamber is partially defined by a flexible layer. Alternatively, the auxiliary fluid chamber may effectively be formed according to a second example, namely by permitting the axially outer elastic wall portions to have an expansion spring constant that is made smaller than that of the axially inner elastic wall portions of the pair of working fluid chambers, while comprising the two first orifice passages and allowing the primary fluid chamber to be held in fluid communication with the pair of working fluid chambers through the two first orifice passages, respectively, so that the pair of working fluid chambers constitute the auxiliary fluid chamber, for example.

According to the first example discussed above, the auxiliary fluid chamber is formed independently of the primary fluid chamber as well as the working fluid chambers, thus making it possible to form the auxiliary fluid chamber with a sufficiently small wall spring characteristics and with a capacity for permitting a relatively large amount of volumetric change thereof, while eliminating adverse effect on the vibration damping characteristics. For the above advantageous features, the fluid-filled vibration-damping device can exhibit a high vibration damping effect with respect to low frequency vibrations on the basis of resonance of the fluid flowing through the first orifice passage, in a further effective manner. According to the second example discussed above, on the other hand, there is no need to form the auxiliary fluid chamber independently of the other chambers, making it possible to form the vibration-damping device compact in its axial length or height. The reduced axial length or height of the vibration damping device is effective to reduce a moment acting on the fixing portions in which the first and second mounting member are fixed to one and the other of two members of a vibration system in a vibration damping manner, even in the case where the second mounting member is fixed to the other member at one of axially opposite end portions remote from the first mounting member. This results in further improved strength or durability of the members of the vibration-damping device at the fixing portions to the members of the vibration system. Moreover, the above-described second example ensures that the axially outer elastic wall portions have an expansion spring constant that is made smaller than that of said axially inner elastic wall portions of the pair of working fluid chambers. In this arrangement, the fluid pressure variation generated in the primary fluid chamber upon application of the vibrational load in the axial direction is compensated or absorbed by the elastic deformation of the axially outer elastic wall portion rather than the axially inner elastic wall portion, namely, the elastic deformation of the axially outer elastic wall portion is effectively restricted, thus assuring a sufficient amount of flows of the fluid through the first orifice passage. As a result, the vibration-damping device constructed according to this preferred form of the invention is capable of exhibiting a high vibration damping effect on the basis of the flows of the fluid through the first orifice passage. It this respect, the term "expansion spring constant" should be interpreted to correspond to an amount of pressure variation of the fluid in each working fluid chamber, which is required to change a volume of the working fluid chamber by unit amount.

According to a third preferred form of the invention, the elastic body protrudes inside the windows from peripheral portions of the windows of the metallic sleeve, while protruding radially outwardly from an outer circumferential surface of the metallic sleeve, so as to form sealing lips to be forcedly pressed onto an inner circumferential surface of the generally cylindrical orifice member. In this arrangement, the sealing lips are provided in the peripheral portions of the windows of the metallic sleeve and forcedly pressed onto the inner circumferential surface of the generally cylindrical orifice member, so that an excellent fluid-tight sealing between fixing surfaces, i.e., the inner circumferential surface of the generally cylindrical orifice member and the outer circumferential surface of the small-diameter portion of the metallic sleeve. This arrangement effectively prevents a leakage of the non-compressible fluid between the fixing surfaces and a resultant short of the orifice passage or the like.

Each of the sealing lips formed on the peripheral portion of the windows of the metallic sleeve may be formed at a desired portions of each window with a suitable circumferential length, while taking into account the shapes of the fluid chambers and generally cylindrical orifice member as well as the windows. Preferably, each window is provided with the sealing lip over its substantially entire circumferential length, in order to assure a further improved fluid-tight sealing between the orifice member and the metallic sleeve. The generally cylindrical orifice member may have a cylindrical shape with a cylindrical wall portion continuously extending over its circumference, or alternatively may have a "C" letter shape in its cross section with a cylindrical wall portion having a gap. The generally cylindrical orifice member may have an variety of axial length. For instance, one of the axially opposite end portions of the generally cylindrical orifice member, which is remote from the small-diameter portion of the metallic sleeve, may be located at the axially intermediate portion of the windows of the metallic sleeve, or alternatively extends over the windows to be located adjacent to the large-diameter portion of the metallic sleeve. In the case where the one end of the generally cylindrical orifice member is located at the axially intermediate portion of the windows, and the other end of the generally cylindrical orifice member is held by and between the metallic sleeve and the cylindrical portion of the second mounting member, the sealing lips formed in the peripheral portion of the windows are forcedly pressed onto the inner circumferential surface of the generally cylindrical orifice member, and the cylindrical portion of the second mounting member is drawing radially inwardly onto the outer circumferential surface of the generally cylindrical orifice member, as well. Thus, the fluid-tight sealing at the portion where the other end of the generally cylindrical orifice member is supported by and between the metallic sleeve and the second mounting member is assured in a sophisticated and stable manner.

In order to further improve the fluid-tightness of the fluid-vibration damping device, a suitable sealing rubber layer is formed over a substantially entire area of the inner circumferential surface of the cylindrical portion of the second mounting member, and is compressed by and between the fixing surfaces of the cylindrical portion of the second mounting member and the generally cylindrical orifice member.

The use of the generally cylindrical orifice member is effective to form the first and second orifice passages. Namely, the first and second orifice members are partially defined by grooves formed and open in the outer circumferential surface of the generally cylindrical orifice member. The openings of the grooves are fluid-tightly closed by the cylindrical portion of the second mounting member, thereby providing the first and second orifice passages. This arrangement makes it possible to form the grooves with a variety of shapes, e.g., a circumferentially extending groove, a vertically extending groove, a spirally extending groove and vending groove. Thus, the first and second orifice passages may be formed with an enhanced degree of freedom in tuning the length and cross sectional area thereof.

According to one advantageous feature of the third preferred form of the invention, the second mounting member has a generally cylindrical cup shape and is disposed relative to the first mounting member such that the support shaft portion of the first mounting member is inserted into a bore of the second mounting member from an open end portion of the second mounting member, while is fluid-tightly press-fitted at the open end portion thereof onto the large diameter annular portion of the metallic sleeve, and wherein the generally cylindrical orifice member is positioned relative to and supported by the second mounting member with the one of axially opposite end portions thereof being held in abutting contact with a bottom wall portion of the second mounting member, and wherein the elastic body and the bottom wall portion of the second mounting member cooperate to form therebetween the primary fluid chamber to be independent of the pair of working fluid chambers, wherein the first orifice passage comprises two first orifice passages that connect the primary fluid chamber to the working fluid chambers, respectively.

According to this advantageous feature of the third preferred form of the invention, the fluid-filled vibration damping device is capable of exhibiting a vibration damping effect with respect to vibrations in the radial direction perpendicular to its central axial direction on the basis of the flows of the fluid through the second orifice passage between the pair of working fluid chambers, and with respect to vibrations in the axial direction on the basis of the flows of the fluid flowing between the primary fluid chamber and the respective working fluid chambers through the first orifice passages, respectively. In addition, the sealing lips formed at the peripheral portion of the windows of the metallic sleeve function to effectively prevent the undesirable leakage of the fluid through the interface between the generally cylindrical orifice member and the metallic sleeve, and the resultant short of the first orifice passages, thereby assuring a desired vibration damping effect on the basis of the flows of the fluid through the first orifice passages without being deteriorated by the short of the first orifice passages. Moreover, the generally cylindrical orifice member is positioned relative to the second mounting member with its end face held in abutting contact with the bottom wall portion of the second mounting member, making it possible to position the generally cylindrical orifice member relative to the second mounting member with high stability, resulting in a further improved fluid-tight sealing between the generally cylindrical orifice member and the cylindrical portion of the second mounting member, and between the generally cylindrical orifice member and the generally cylindrical orifice member and the metallic sleeve. It is noted that the both of the first and second orifice passage can be formed with the single generally cylindrical orifice member, making it possible to effectively form the first and second orifice passages with the reduced number of the components and simplified structures of the first and second orifice passages.

According to another advantageous features of the third preferred form of the invention, the second mounting member has a generally cylindrical cup shape and is disposed relative to the first mounting member such that the support shaft portion of the first mounting member is inserted into a bore of the cylindrical portion of the second mounting member from an open end portion of the second mounting member, while is fluid-tightly press-fitted at the open end portion thereof onto the large diameter annular portion of the metallic sleeve. The generally cylindrical orifice member is positioned relative to and supported by the second mounting member with the one of axially opposite end portions thereof being held in abutting contact with a bottom wall portion of the second mounting member. The bottom wall portion of the second mounting member is at least partially formed by a flexible layer. The vibration damping device further including a partition member disposed between the elastic body and the flexible layer and cooperating with the elastic body to form the primary fluid chamber on one of axially opposite sides thereof, and with the flexible layer to form the auxiliary fluid chamber on an other one of axially opposite sides thereof, and wherein the first orifice passage for fluid communication between the pressure-receiving chamber and the equilibrium chamber is formed in a radially outer portion of the partition member.

According to this arrangement, the fluid-filled vibration damping device is capable of exhibiting an excellent vibration damping effect upon application of the radial vibrational load on the basis of the flows of the fluid through the second orifice passage between the working fluid chambers, and upon application of the axial vibrational load on the basis of the flows of the fluid through the first orifice passage between the primary fluid chamber and the auxiliary fluid chamber. In addition, the use of the flexible diaphragm allows the equilibrium chamber to absolve an increase in the pressure of the fluid in the primary fluid chamber, upon application of a static load between the first and second mounting members. Thus, the fluid-filled vibration-damping device is able to exhibit a desired vibration damping effect with high stability, in particular when the vibration-damping device is used as an engine mount for use in an automotive vehicle, and is installed in position with a static supporting load being applied between the first and second mounting members.

In the fluid-filled vibration damping device according to any one of the above-described advantageous features of the third preferred form of the invention, the sealing lips formed at the peripheral portions of the windows of the metallic sleeve may be formed as follows by way of example. First, the sealing lips are integrally formed in the integral vulcanized assembly consisting of the elastic body and the first mounting member and the metallic sleeve, when a rubber material is vulcanized in a given mold cavity in which the first mounting member and the metallic sleeve are set in position. Then, the formed sealing lips are projected toward the radially outward of the outer circumferential surface of the metallic sleeve. Alternatively, the sealing lips may be formed after the above-indicated vulcanization of the rubber material for forming the elastic body.

Described in detail, the sealing lips may be integrally formed at the integral vulcanized assembly such that the sealing lips protrude straightly inside the windows or slightly radially outwardly from the outer circumferential surface of the second mounting member. Then, the obtained integral vulcanized assembly is subjected to a drawing operation or the like, in order to radially inwardly draw the metallic sleeve, making it possible to protrude the sealing lips radially outwardly of the outer circumferential surface of the metallic sleeve, by a given amount.

Preferably, the sealing lips are integrally formed at the elastic body of the integral vulcanized assembly such that the sealing lips are formed at the peripheral portion of the windows so as to protrude straightly inside the windows while being aligned with the outer circumferential surface of the metallic sleeve in the axial direction, and then the metallic sleeve is radially inwardly drawn so as not only to give a pre-compression in the radial direction to the elastic body but to protrude radially outwardly the sealing lips from the outer circumferential surface of the metallic sleeve also. Namely, this arrangement makes it possible to surely cut the elastic body at around the peripheral portion of the windows of the metallic sleeve, in the process of the vulcanization, thus effectively preventing an occurrence of a possible drawback that the elastic body extends radially outwardly from the window to the outer circumferential surface of the metallic sleeve, which may cause undesirable deterioration of the fluid-tightness of the fluid chambers.

BRIEF DESCRIPTION OF THE DRAWINGS

The foregoing and/or optional objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
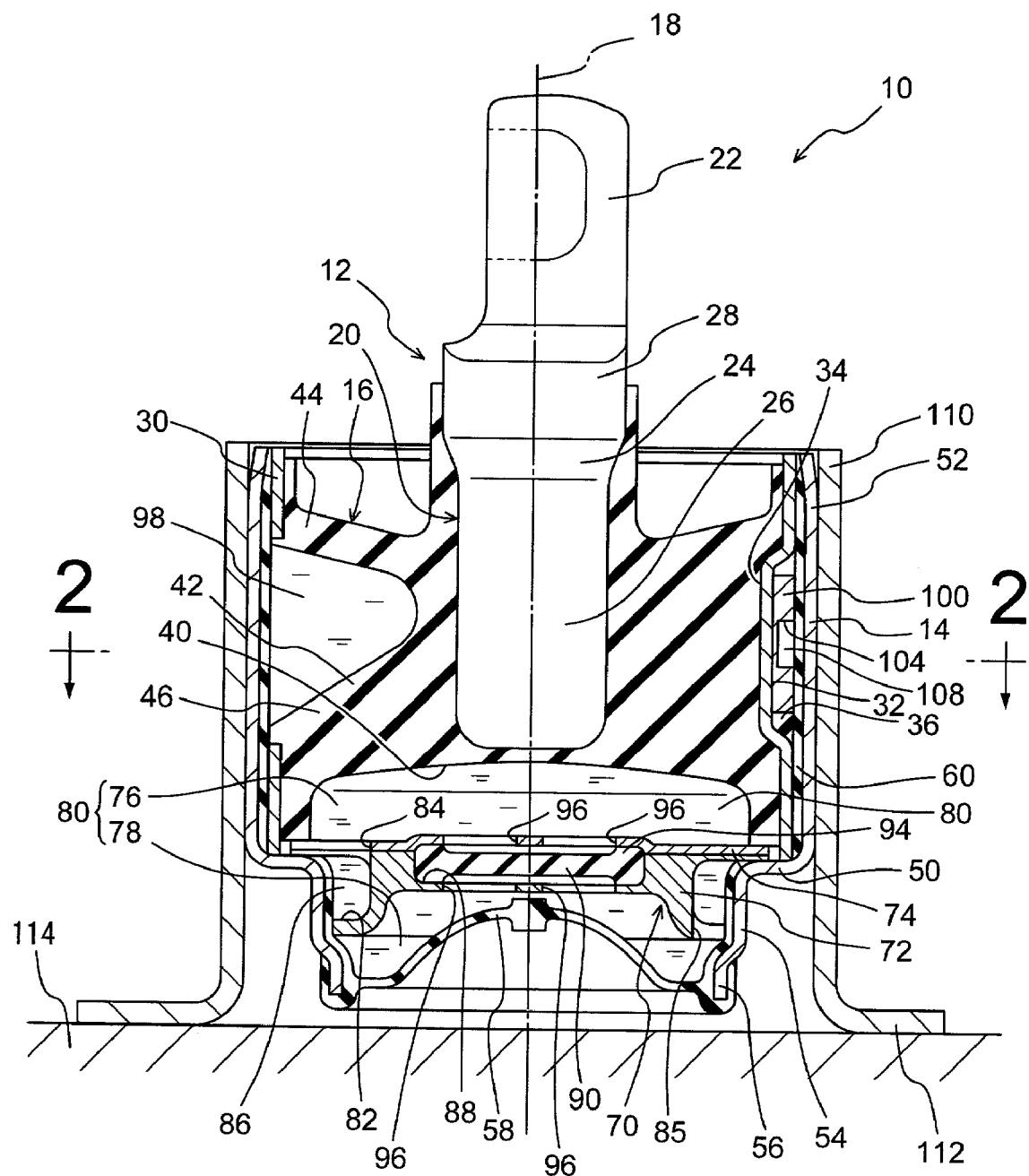
FIG. 1 is an elevational view in axial or vertical cross section of a fluid-filled vibration-damping device in the form of an engine mount constructed according to a first embodiment of the present invention, the cross sectional view being taken along line 1—1 of FIG. 2.
Figure 2:
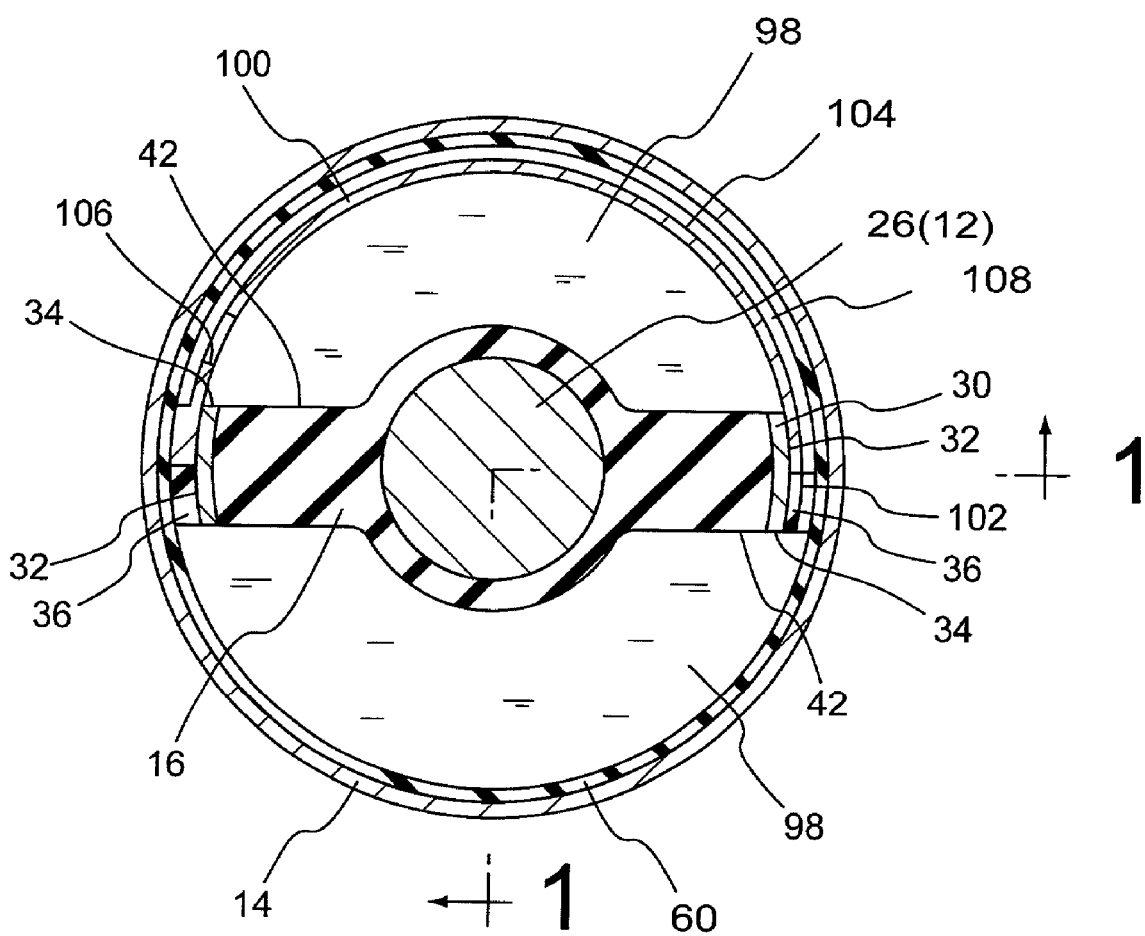
FIG. 2 is a cross sectional view taken along line 2—2 of FIG. 1.

Referring first to FIGS. 1 and 2, an engine mount 10 for use in an automotive vehicle is shown as a first embodiment of a fluid-filled vibration-damping device of the present invention. This engine mount 10 includes a first mounting member 12 and a second mounting member 14, which are made of suitable metallic materials. These first and second mounting members 12, 14 are spaced apart from each other in their axial direction, that is, in the direction of a central axis 18 of the engine mount 10, and are elastically connected to each other by an elastic body 16 interposed therebetween. The first mounting member 12 is adapted to be attached to the power unit of the vehicle, while the second mounting member 14 is adapted to be attached to the body of the vehicle, so that the power unit is mounted on the vehicle body in a vibration damping fashion. The engine mount 10 is installed on the vehicle with its central axis 18 extends in the vertical direction as seen in FIG. 1 and in a direction almost parallel to the vertical direction.

Described more specifically, the first mounting member 12 includes a support shaft portion 20 having a solid cylindrical shape with a small diameter and extending straightly in the vertical direction as seen in FIG. 1. The first mounting member 12 further includes a fixing portion 22 having a thick-walled flat-plate shape and integrally formed at an axially or vertically upper end portion of the support shaft portion 20. The support shaft portion 20 has a tapering part 24 at its axially intermediate portion, and a small-diameter part 26 and a large-diameter part 28 on the axially lower and upper sides of the tapering part 24, respectively.

The engine mount 10 further includes a thin-walled hollow cylindrical metallic sleeve 30, which has a relatively large inner diameter, and is disposed approximately coaxial or concentric relation with the first mounting member 12 with a given radial spacing therebetween. The metallic sleeve 30 is a stepped cylindrical member provided with an axially intermediate small diameter portion and large-diameter portions disposed on the axially opposite sides of the small-diameter portion, whereby a circumferential groove 32 is formed at an axially intermediate portion of the metallic sleeve 30 so as to be open in the outer circumferential surface of the metallic sleeve 30, and so as to extend in a circumferential direction of the metallic sleeve 30. Also, the metallic sleeve 30 has a pair of windows 34, 34, which are formed at axially intermediate portion of the metallic sleeve 30, and which are located at respective circumferential portions that are opposed to each other in one diametric direction of the metallic sleeve 30. Each of the pair of windows 34 has an axial dimension or width that is slightly larger than that of the circumferential groove 32, and has a circumferential dimension or length that is slightly smaller than a half of the circumference of the metallic sleeve 30. The presence of the pair of windows 34, 34 divides the circumferential groove 32 into two sections each extending in the circumferential direction of the metallic sleeve 30 over the mutually opposed circumferential edges of the adjacent windows 34, 34.

The first mounting member 12 and the metallic sleeve 30 are disposed in the coaxial or concentric relation with each other such that the small diameter portion 26 of the support shaft portion 20 of the first mounting member 12 is surrounded entirely by the metallic sleeve 30 disposed radially outwardly thereof with a radial spacing therebetween. In other words, the first mounting member 12 is positioned relative to the metallic sleeve 30 such that the fixing portion 22 is located axially upwardly of the axially upper end portion of the metallic sleeve 30, while the axially lower end portion of the support shaft portion 20 is located in the axially intermediate portion so as not to reach the axially lower end portion of the metallic sleeve 30.

The elastic body 16 is interposed between the support shaft portion 20 of the first mounting member 12 and the metallic sleeve 30 for elastically connecting the first mounting member 12 and the metallic sleeve 30 with each other. The elastic body 16 has a thick walled cylindrical shape in its entirety, and is bonded at its inner circumferential surface to the outer circumferential surface of the support shaft portion 20 and at its outer circumferential surface to the inner circumferential surface of the metallic sleeve 30 in the process of vulcanization of a rubber material for forming the elastic body 16. Thus, it is provided an integral vulcanized assembly 38 consisting of the elastic body 16, the first mounting member 12 and the metallic sleeve 30. Also, the elastic body 16 extends to the outer circumferential surface of the metallic sleeve 30 through the windows 34, 34 of the metallic sleeve 30, and fills the divided circumferential groove 32. Therefore, filling rubbers 36, 36 are provided in the circumferential groove 32.

Further, the elastic body 16 has a large diameter recess 40 open in its axially lower end face, and a pair of pockets 42, 42 open at respective circumferential portions in its outer circumferential surface so as to opposed to each other in the diametric direction of the elastic body 16. Each of the pockets 42 has a generally mortar shape in axial cross section with the axial width gradually increased in the radially outward direction of the elastic body 16 (see FIG. 1), and extends in the circumferential direction of the elastic body 16 with a circumferential length slightly smaller than a half of the circumference of the elastic body (see FIG. 2). These pockets 42, 42 are open in the outer circumferential surface of the metallic sleeve 30 through the windows 34, 34 of the metallic sleeve 30, respectively.

The pair of pockets 42, 42 are axially upwardly offset from the axially central portion of the elastic body 16 by a given axial distance, as seen in FIG. 1. This arrangement allows each pockets 42 has different wall thickness in its axially upper and lower wall portions 44, 46. Namely, the axially upper wall portion 44 as an axially outer elastic wall portion has the wall thickness that is made smaller than that of the axially lower wall portion 46 as an axially inner elastic wall portion. As a result, the axially upper wall portion 44 exhibits a relatively large spring constant in the axial and radial directions, in comparison with the axially lower wall portion 46. Also, the axially upper wall portion 44 exhibits a relatively small spring constant in a direction in which the upper wall portion 44 is expanded (herein after referred to as an "expansion spring constant") in comparison with the axially lower wall portion. With respect to each pocket 42, the axially upper wall portion 44 has an elastic center line extending radially outwardly while inclining to the axially upward direction, and the axially lower wall portion 46 has an elastic center line extending radially outwardly while inclining to the axially downward direction. The axially upper wall portion 44 has an axially opposite surfaces that extends parallel to each other.

The second mounting member 14 is a generally cylindrical member having a diameter that is made larger than the outer diameter of the metallic sleeve 30. The second mounting member 14 consists of an axially intermediate shoulder portion 50, a large-diameter cylindrical portion 52 located on the axially upper side of the shoulder portion 50, and a small-diameter cylindrical portion 54 located on the axially lower side of the shoulder portion 50, as seen in FIG. 1. The large-diameter cylindrical portion 52 has an axial length that is made approximately equal to that of the metallic sleeve 30, while the small-diameter cylindrical portion 54 has a small-diameter part in its axially lower open-end portion to thereby provide an annular fixing portion 56. To this annular fixing portion 56, a flexible layer in the form of a flexible diaphragm 58 is bonded at its peripheral portion in the process of vulcanization of a rubber material for forming the flexible diaphragm 58. This flexible diaphragm 58 is a thin disk-like rubber layer, and is provided with a suitable amount of slag for facilitating displacement or deformation of the flexible diaphragm 58. Thus, the lower open end of the second mounting member 14 is fluid-tightly closes by the flexible diaphragm 58.

A thin sealing rubber layer 60, which is integrally formed with the flexible diaphragm 58, is bonded to an inner circumferential surface of the second mounting member 14 upon vulcanization of a rubber material of the flexible diaphragm 58 so that an approximately entire area of the inner circumferential surfaces of the large diameter cylindrical portion 52 and the small diameter cylindrical portion 54 are coated by the sealing rubber layer 60.

The large diameter cylindrical portion 52 of the second mounting member 14 is mounted onto or disposed radially outwardly on the outer circumferential surface of the integral vulcanized assembly including of the elastic body 16. The large diameter cylindrical portion 52 is then radially inwardly drawn onto the integral vulcanized assembly, by all directional drawing, for example, whereby the large-diameter cylindrical portion 52 of the second mounting member 14 is firmly fitted onto the outer circumferential surface of the metallic sleeve 30. In this state, the lower end face of the metallic sleeve 30 is held in abutting contact with the shoulder portion 50 of the second mounting member 14, whereby the metallic sleeve 30 is positioned relative to the second mounting member in the axial direction. Also, the sealing rubber layer 60 is compressed by and between the outer circumferential surface of the metallic sleeve 30 and the inner circumferential surface of the second mounting member 14.

With the second mounting member 14 fixedly mounted on the metallic sleeve 30 as described above, an opening of the large diameter cylindrical portion 52 is fluid-tightly close by the elastic body 16, thus providing a fluid chamber 80 on the bottom or lower side of the second mounting member 14. The fluid chamber 80 is filled with a non-compressible fluid, suitably selected from among various known non-compressible fluid including water, alkylene glycol, polyalkylene glycol, silicone oil, and mixtures thereof. To assure an excellent vibration damping effect of the engine mount 10 on the basis of resonance or flows of the non-compressible fluid through orifice passages, which will be described later, the non-compressible fluid desirably has a viscosity not higher than 0.1 Pa.·s.

Within the fluid chamber 80, a partition member 70 having an thick-walled disk-like shape in its entirety is disposed in its horizontal orientation. The partition member 70 includes a thick walled metallic partition plate 72 and a thin-walled metallic rid plate 74 superposed on the upper surface of the metallic partition plate 72. The peripheral portion of the partition plate 72 and the rid plate 74 are held in close contact with each other, and forcedly gripped by and between the shoulder portion 50 of the second mounting member 14 and the lower end face of the peripheral portion of the elastic body 16 in the axial direction, so that the partition member is fixedly attached to the second mounting member 14. As a result, the partition member 70 fluid-tightly divides the fluid chamber 80 into two parts, i.e., a primary fluid chamber in the form of a pressure receiving chamber 76 on the upper side of the partition member 70 and an auxiliary fluid chamber in the form of an equilibrium chamber 78 on the lower side of the partition member 70. The pressure-receiving chamber 76 is partially defined by the elastic body 16 and causes a fluid pressure variation upon application of a vibrational load due to the elastic deformation of the elastic body 16. On the other hand, the equilibrium chamber 78 is partially defined by the flexible diaphragm 58 and permits a change of a volume thereof due to the deformation of the flexible diaphragm 58.

Further, the partition member 70 has an circumferential groove 82 open in its outer circumferential surface and extending in its circumferential direction with a circumferential length that is slightly smaller than the circumference of the partition member 70. The opening of the circumferential groove 82 is fluid tightly closed by the small diameter cylindrical portion 54 of the second mounting member 14. Thus, a first orifice passage 86 is formed at the circumferential portion of the partition member so as to extend in the circumferential direction. This orifice passage 86 communicates at one of circumferentially opposite ends thereof with the pressure receiving chamber 76 through a communication hole 84 formed through the rid plate 84, and at the other end with the equilibrium chamber 78 through a communication hole 85 formed through the partition plate 72. That is, the pressure receiving chamber 76 and the equilibrium chamber 78 are held in fluid communication with each other through the first orifice passage 86. In the present embodiment, the first orifice passage 86 is suitably dimensioned in terms of the length, the cross sectional area, or the like so that the engine mount 10 can exhibit an high damping effect with respect to low frequency vibrations corresponding to engine shakes, on the basis of resonance or flows of the fluid through the first orifice passage 86.

The metallic partition plate 72 of the partition member 70 has a central recess 88 open in its upper surface. This central recess 88 houses therein a disk-like shaped movable rubber plate 90 with a given thickness. The opening of the central recess 88 is closed by the rid plate 74. The thickness of the movable rubber plate 90 is increased in its peripheral portion rather than its central portion so as to form an annular support part 94. This annular support part 94 is gripped by and between the metallic partition plate 72 and the metallic rid plate 74, so that the central portion of the movable rubber plate 90 is elastically deformable by a given axial distance within the central recess 88. The bottom wall portion of the central recess 88 (i.e., the partition plate 72) and the central portion of the rid plate 74 that covers the opening of the recess 88 are both provided with a plurality of communication holes 96. Therefore, the fluid pressure in the pressure-receiving chamber 76 acts on the upper surface of the movable rubber plate 90 through the communication holes 96 formed through the rid plate 74, while the fluid pressure in the equilibrium chamber 78 acts on the lower surface of the movable rubber plate 90 through the communication holes 96 formed through the bottom wall portion of the central recess 88. As a result, the movable rubber plate 90 is elastically deformed on the basis of the pressure difference between the fluid pressures acting on the upper and lower surfaces of the movable rubber plate 90. The resultant elastic deformation of the movable rubber plate 90 causes a substantial flows of the fluid between the pressure receiving chamber 76 and the equilibrium chamber 78 through the communication holes 96 and the recess 88, by an amount corresponding to the resultant elastic deformation of the movable rubber plate 90. Thus, the change of the fluid pressure in the pressure-receiving chamber 76 is reduced or absorbed on the basis of the elastic deformation of the movable rubber plate 90. In the present embodiment, the movable rubber plate 90 is brought into abutting contact with the bottom wall portion of the recess and the central portion of the rid plate 74 so as to limit or restrict an amount of elastic deformation of the movable rubber plate 90. This arrangement makes it possible for the engine mount 10 not only to effectively absorb or attenuate the variation of the fluid pressure in the pressure-receiving chamber 76 upon application of vibrations having a high-frequency and a small-amplitude, e.g., booming noises, on the basis of the elastic deformation of the movable rubber plate 90, but to ensure an effective pressure variation of the fluid in the pressure receiving chamber 76 upon application of vibrations having a low-frequency and a large amplitude as a result of the limitation of the elastic deformation of the movable rubber plate 90.

With the second mounting member 14 fixedly mounted on the metallic sleeve 30, the second mounting member 14 fluid-tightly closes the windows 34, 34 of the second mounting 14, and the opening of the pair of pockets 42, 42, thereby providing a pair of working fluid chambers 98, 98 both filled with the same non-compressible fluid filling the pressure receiving chamber 76.

One of the pair of the working fluid chambers 98 houses an orifice member 100. The orifice member 100 is a generally semi-annular or a semi-cylindrical member formed of a synthetic resin material, a metallic material or the other rigid material, and is disposed so as to circumferentially extend along the inner circumferential surface of the second mounting member 14 across or over the opening of the pocket 42 of the one working fluid chambers 98, with its circumferentially opposite end portions supported by the circumferential groove 32 of the metallic sleeve 30. Described in detail, the filling rubbers 36, 36 formed in the divided circumferential grooves 32, 32 of the metallic sleeve 30 have respective fixing grooves 102, 102 each extending in the circumferential direction at an axially intermediate portion of the corresponding filling rubber 36. The circumferentially opposite end portions of the orifice member 100 are firmly fitted into the fixing grooves 102, 102, whereby the orifice member 100 is fixedly assembled with the metallic sleeve 30.

Also, the orifice member 100 has a rectangular groove 104 open in its outer circumferential surface and continuously extending circumferentially from one of circumferentially opposite ends thereof and to a portion close to the other end thereof. The terminated end of the rectangular groove 104 is open to one of the working fluid chambers 98 located below the orifice member 100 through a communication hole 106 formed through the bottom wall portion of the rectangular groove 104. On the other hand, the open end of the rectangular groove 104 is held in fluid communication with the other working fluid chamber 98, which is remote from the orifice member 100, through the fixing groove 102 formed in the adjacent ones of the filling rubber 36. The second mounting member 14 also fluid-tightly closes the opening of the rectangular groove 104, thereby providing a second orifice passage 108 for fluid communication between the pair of working fluid chambers 108. In the present embodiment, the length, the cross sectional area, or other parameters of the second orifice passage 108 are tuned so that the engine mount 10 is able to exhibit a high damping effect on the basis of resonance or flows of the fluid through the second orifice passage 108 with respect to low frequency vibrations such as engine shakes.

As is understood from the foregoing description, the engine mount 10 of the present embodiment is press fitted into a bore of the bracket 110 as shown in FIG. 1. The bracket 110 includes a hollow cylindrical body and a mounting member 112 integrally formed at an axially lower end portion of the cylindrical body as seen in FIG. 1. This bracket 110 is fixed to the body 114 of the vehicle, e.g., the tire house, with its mounting part 112 being placed on and bolted to the body 114, such that the central axis of the engine mount 10, namely, the central axes of the first and second mounting members 12, 14 extends in the approximately vertical direction, while the first mounting member 12 is bolted to the power unit (not shown), so that the power unit is mounted on the body of the vehicle in a vibration isolating fashion. With the engine mount 10 installed between the first and second mounting members 12, 14 as described above, the load or weight of the power unit acts on the engine mount 10 in the vertical direction, so that the elastic body 16 is elastically deformed by a given amount.

In order to support a transversely mounted engine for front-engine front-drive motor vehicles (FF-type vehicles), for example, two engine mounts 10, 10 are adopted to support the engine on the both sides of the engine in a widthwise direction of the vehicle. In this case, each of the engine mounts 10 is disposed such that the engine mount 10 is approximately located on a primary inertia axis of the power unit with the working fluid chambers 98, 98 opposed to each other in a longitudinal direction of the vehicle.

In a state where the engine mount 10 is installed on the vehicle as described above, vibrational loads are applied between the first and second mounting members 12, 14 in the approximately vertical direction, thus causing a fluid pressure difference between the pressure receiving chamber 76 and the equilibrium chamber 78. When low-frequency large-amplitude vibrations, such as engine shakes are applied to the engine mount 10, the fluid is forced to flow through the first orifice passage 86 between the pressure receiving chamber 76 and the equilibrium chamber 78 due to the pressure difference between these two chambers 76, 78. Thus, the engine mount 10 is able to exhibit a high damping effect on the basis of the resonance of the fluid flowing through the first orifice passage 86, with respect to the low-frequency high-amplitude vibrations. When high-frequency small-amplitude vibrations such as booming noises is applied to the engine mount 10, the pressure variation induced in the pressure receiving chamber 76 is absorbed or reduced with the help of the elastic deformation of the movable rubber plate 90, thereby exhibiting a low dynamic spring constant in the high frequency range of the input vibrations. Thus, the engine mount 10 is able to exhibit an excellent vibration isolating effect with respect to the high-frequency small-amplitude vibrations.

On the other hand, the engine mount 10 installed in position as described above is also subjected to vibrational loads applied thereto in the longitudinal direction or the vehicle running direction. In this case, a fluid pressure difference between the pair of working fluid chambers 98, 98 is induced, allowing the fluid to flow through the second orifice passage 108 between the working fluid chambers 98, 98. Thus, the engine mount 10 is also capable of exhibiting a high damping effect with respect to low-frequency high-amplitude vibrations, such as engine shakes, on the basis of resonance of the fluid flowing through the second orifice passage 108.

In the present engine mount 10, the presence of the working fluid chambers 98, 98 substantially divide the elastic body 16 interposed between the first and second mounting members 12, 14 for elastic connection between these two members 12, 14, into axially spaced apart two parts, i.e. the axially upper wall portion 44 and the axially inner lower wall portion 46. As is apparent from FIG. 1, the axially lower wall portion 46 has a wall thickness that is made larger than that of the axially outer wall portion 44, and a spring constant in the diametrical direction that is accordingly larger than that of the axially outer wall portion 44. This arrangement is effective to set an elastic center of the elastic body 16 for supporting the first mounting member 12 and the second mounting member 14 with each other in the diametric direction (herein after referred to as "elastic support center" of the engine mount 10") in the axially lower portion of the engine mount 10, that is located axially lower than the axially intermediate portion of the elastic body 16.

Therefore, the engine mount 10 has its elastic support center in the radial direction perpendicular to its central axis, which is set to a portion located axially downward of the fixing portion 22 of the first mounting member 12 with a sufficiently large axial distance therebetween, as seen in FIG. 1. More specifically, the elastic support center of the elastic mount 10 is located axially downward of the axially central portion of the elastic body 16. This arrangement allows the engine mount 10 to locate its elastic support center close to the primary inertia axis, even in the case where the engine mount 10 is mounted on the body 114 at a portion of the tire house, and the fixing portion 22 of the first mounting member 12 is likely to be attached to a portion of the power unit, which is located above the primary inertia axis of the power unit. Thus, the present engine mount 10 is capable of elastically supporting the power unit on the body of the vehicle with an improved manner.

Since the elastic center of the elastic body 16 functions as a load center of the input vibrational load in the radial direction perpendicular to the central axis of the engine mount 10 relative to the second mounting member 14, the engine mount 10 of the present embodiment is arranged such that the elastic center of the elastic body 16 is locatable at an axial position of offset axially downwardly from the axially upper end portion of the second mounting member 14 by a sufficiently large axial distance. This arrangement makes it possible to reduce or minimize a distance between the fixing portion of the second mounting member 14 to the body 114 via the bracket 110 and the load center. As a result, an amount of moment acting on the fixing portion of the second mounting member 14 to the body 114 is effectively reduced, thus improving stability or durability of the engine mount 10 as measured at the fixing portion of the second mounting member 14 to the body 114.

In the engine mount 10 constructed as described above, the axially lower wall portions 46, 46 of the pair of working fluid chambers 98, 98 are arranged to have the larger wall thickness in comparison with those of the axially upper wall portion 44 of the working fluid chambers 98, 98. Accordingly, the axially lower wall portions 46, 46 of the working fluid chambers 98, 98 have a large expansion spring constant in comparison with those of the axially upper wall portions 44, 44, making it difficult for the axially lower portions 46, 46 to elastically deform. It is therefore effectively prevented that the pressure variation induced in the pressure-receiving chamber 76 upon application of the vibrational load in the axial direction is absorbed by the elastic deformation of the axially lower wall portions 46, 46. This allows the engine mount 10 to effectively induce the pressure difference between the pressure receiving chamber 76 and the equilibrium chamber 78, leading to an effective increase in an amount of flows of the fluid through the first orifice passage 86. Thus, the engine mount 10 is capable of exhibiting a vibration damping effect on the basis of the resonance of the fluid flowing through the first orifice passage 86 in a further effective manner.

In the engine mount 10 of the present embodiment, the pressure receiving chamber 76 and the equilibrium chamber 78, whose fluid pressure vary relative to each other upon application of the vibrational load in the axial or vertical direction, are formed independently of the pair of fluid chambers 98, 98 whose fluid pressure vary relative to each other upon application of the vibrational load in the diametric or horizontal direction. This arrangement makes it possible not only to form each of these chambers 76, 78, 98, 98 with a sufficiently large volume for ensuring a sufficient amount of flows of the fluid through the first and second orifice passages 86, 108, but to desirably tune vibration damping characteristics of the engine mount 10 with ease, by adjusting the wall-spring characteristics of the pressure receiving chamber 76, the equilibrium chamber 78 and the working fluid chamber 98.

Figure 3:
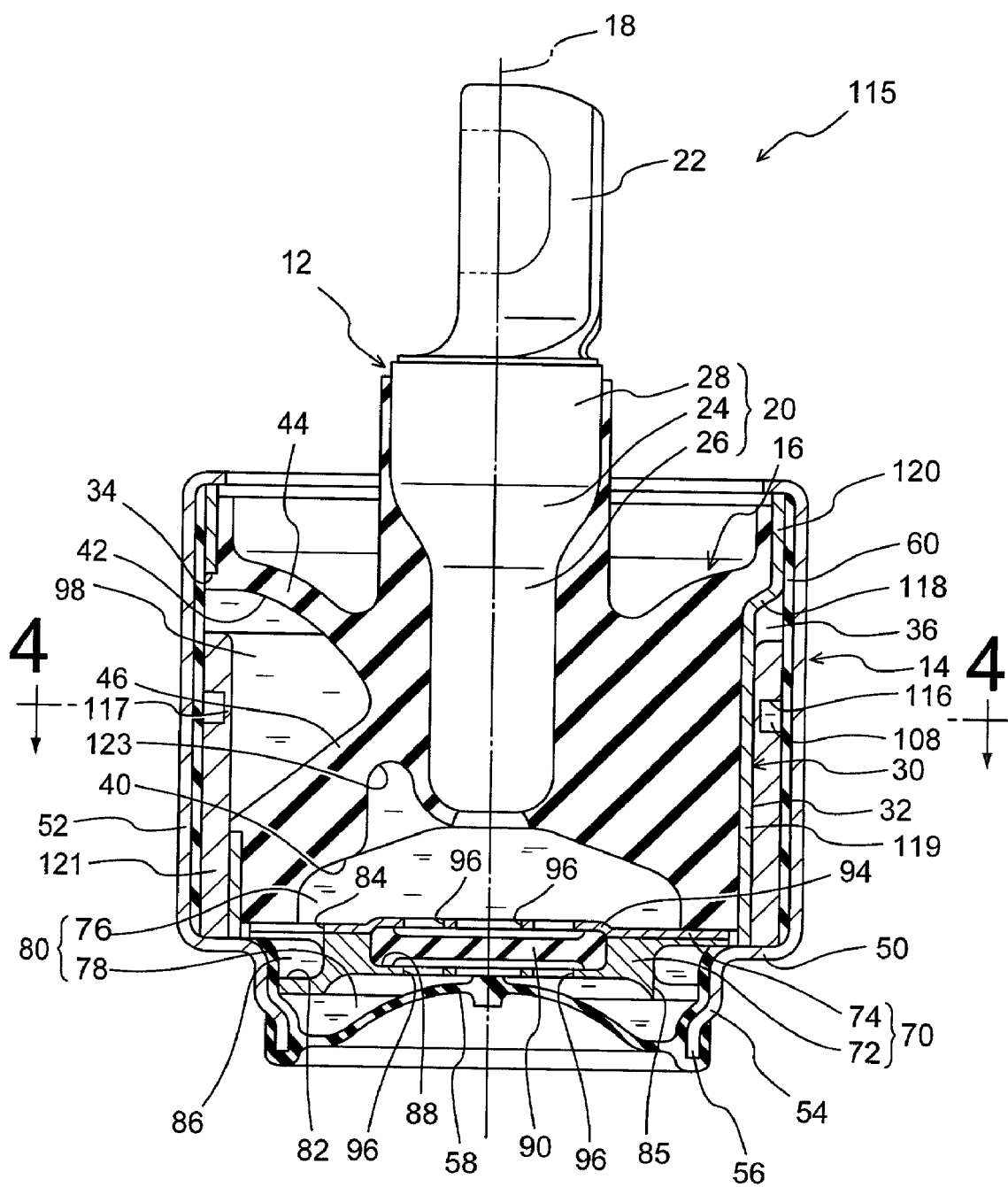
FIG. 3 is an elevational view in axial or vertical cross section of a fluid-filled vibration-damping device in the form of an engine mount constructed according to a second embodiment of the present invention, the cross sectional view being taken along line 3—3 of FIG. 4.
Figure 4:
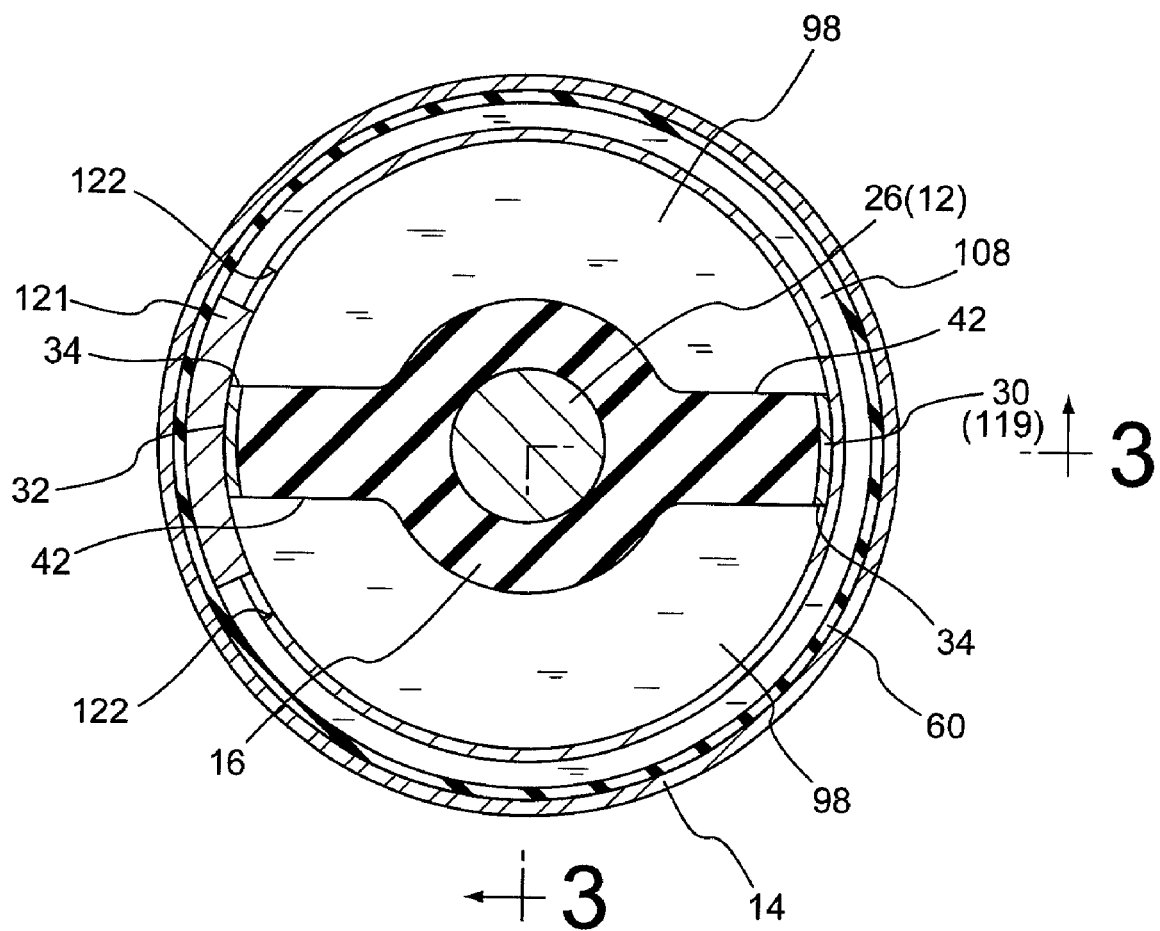
FIG. 4 is a cross sectional view taken along line 4—4 of FIG. 3.
Figure 5:
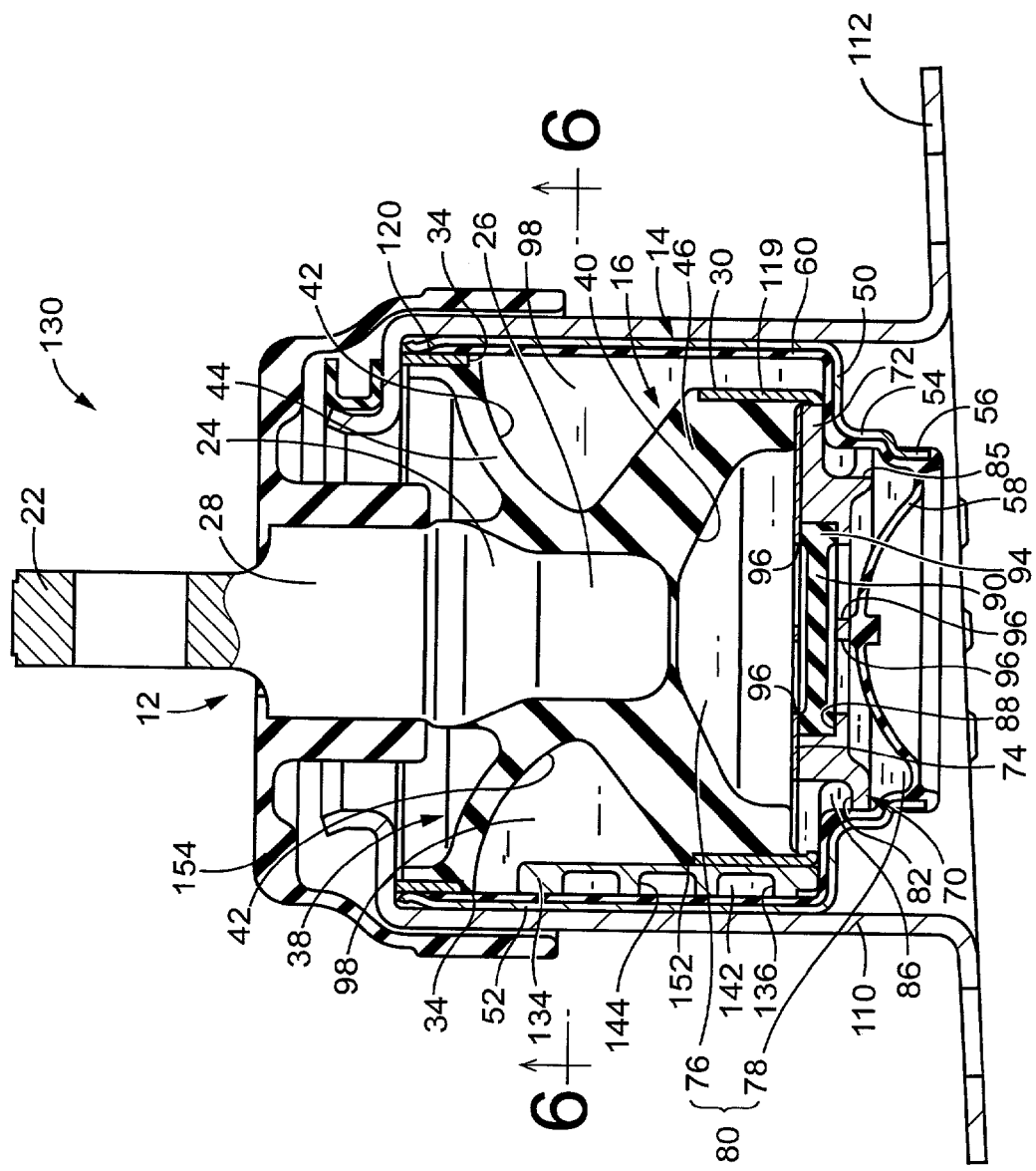
FIG. 5 is an elevational view in axial or vertical cross section of a fluid-filled vibration-damping device in the form of an engine mount constructed according to a third embodiment of the present invention, the cross sectional view being taken along line 5—5 of FIG. 6.
Figure 6:
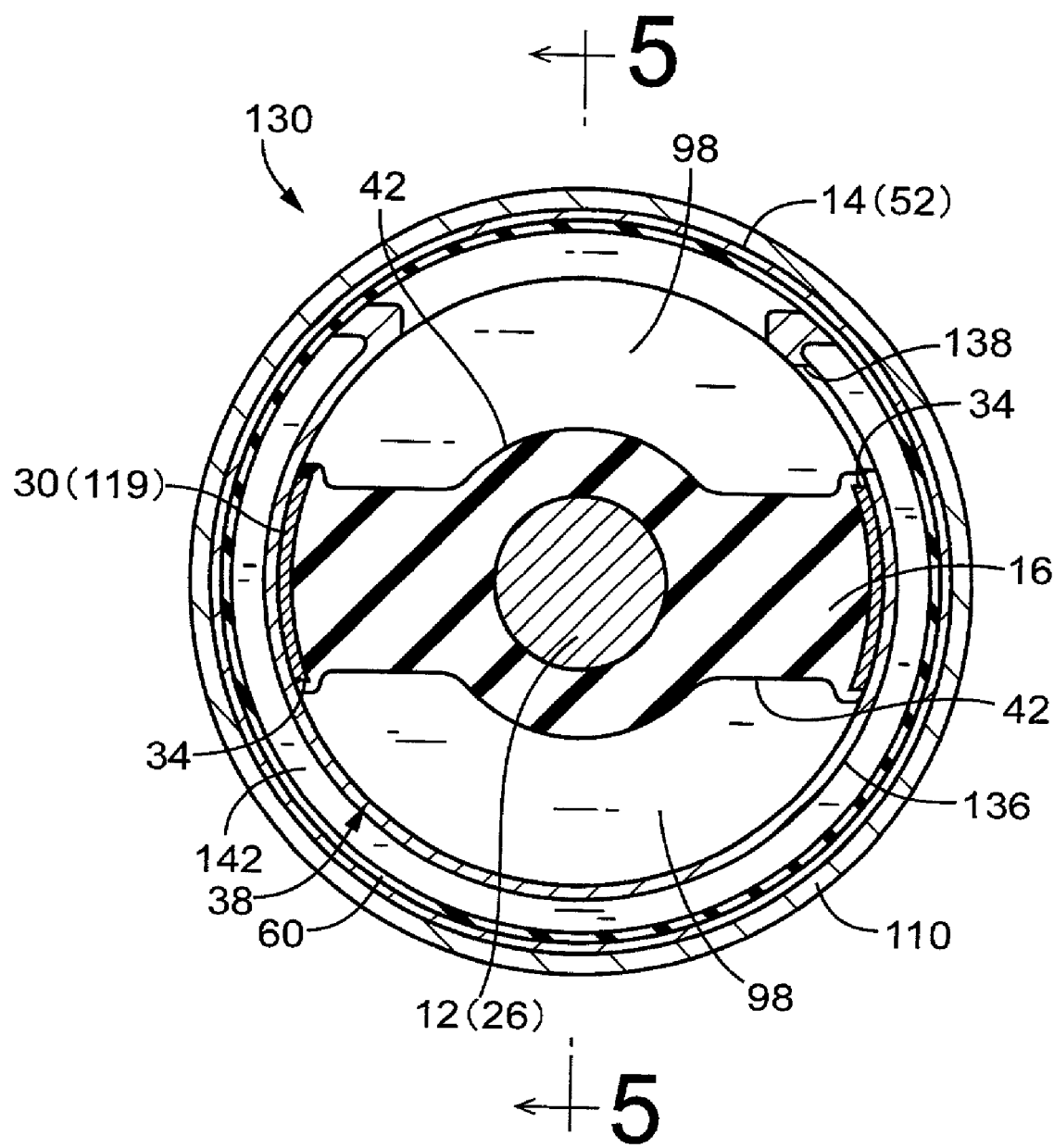
FIG. 6 is a cross sectional view taken along line 6—6 of FIG. 5.

Referring next to FIGS. 3 and 4, there is shown an engine mount 115 for use in an automotive vehicle, which is constructed according to a second preferred embodiment of the present invention. In the following description as to the second embodiment, the same reference numerals as used in the first embodiment will be used to identify the functionally corresponding elements, and redundant descriptions of those elements will not be provided.

In the engine mount 115 according to the present embodiment, the metallic sleeve 30 has a shoulder 118 located its axially upper portions thereof rather than an axially central portion. The metallic sleeve 30 includes a small diameter portion 119 on the axially lower side of the shoulder 118 and a large diameter portion 120 on the axially upper side of the shoulder 118 as seen in FIG. 3. Namely, the metallic sleeve 30 of the present embodiment has a structure wherein the circumferential groove 32 may be elongated toward an axially lower end portion of the metallic sleeve 30 in comparison with the first embodiment.

A cylindrical orifice member 121 is press-fitted onto the outer circumferential surface of the small diameter portion 119 of the metallic sleeve 30. This cylindrical orifice member 121 is a hollow cylindrical metallic member having an axial length enough to stretch from the axially lower end of the metallic sleeve 30 to the axially upper parts of the windows 34, 34 across the axially central portions of the windows 34, 34. The cylindrical orifice member 121 is disposed within the bore of the second mounting member 14 with its outer circumferential surface held in close contact with the inner circumferential surface of the large diameter portion of the second mounting member 14, and with its axially lower end portion forcedly held by and between the metallic sleeve 30 and the second mounting member 14, while assuring fluid-tight sealing between these portions. Thus, the cylindrical orifice member 121 is fixedly assembled with the second mounting member 14.

The cylindrical orifice member 121 has a circumferential groove open in its outer circumferential surfaces at its axially intermediate portion, and extending in its circumferential direction with a circumferential length that is slightly smaller than a circumference thereof. This circumferential groove 116 has circumferentially opposite ends one of which is held in fluid communication with one of the working fluid chambers 98 through a communication hole 122 formed through the corresponding portion of the bottom wall portion 117, and the other of which is held in fluid communication with the other working fluid chamber 98 through a communication hole 122 formed through the corresponding portion of the bottom wall portion 117. The opening of the circumferential groove 116 is fluid-tightly closed by the second mounting member 14, thereby providing a second orifice passage 108 for fluid communication between the pair of the working fluid chambers 98, 98.

Like the first embodiment, the engine mount 115 constructed according to the present embodiment may be installed between the power unit and the body of the vehicle by utilizing a cylindrical bracket, for example. Thus, the engine mount 115 is capable of exhibiting an excellent vibration damping and isolating effect, likewise. In particular, the adoption of the cylindrical orifice member 121 makes it possible to form the second orifice passage 108 with a circumferential length that is larger than a half of the circumference of the cylindrical orifice member 121, thus increasing a degree of freedom in tuning the length of the second orifice passage 108 and the vibration damping characteristics of the engine mount 115.

In the engine mount 115 constructed according to the present embodiment, the metallic sleeve 30 has its small diameter portion 119 on the axially lower side of the shoulder 118. This arrangement allows the axially lower wall portions 46, 46 of the working fluid chambers 98, 98 to have an outer diameter and a resultant axial free length thereof, which are smaller than those of the axially upper wall portions 44, 44 of the working fluid chambers 98, 98. Accordingly, the axially lower wall portions 46, 46 can have a larger spring constant as well as a larger expansion spring constant in the radial direction of the engine mount 115, in comparison with the axially upper wall portions 44, 44. In this arrangement, the elastic center of the elastic body 16 for supporting the first mounting member 12 can be effectively set to an axially lower portion of the engine mount 115. As a result, the engine mount 115 is capable of supporting the power unit on the body of the vehicle with an improved anti-vibration supporting capacities, while assuring an improved strength or durability thereof at a portion where the second mounting member 14 is fixed to the body of the vehicle.

In the engine mount 115 of the present embodiment, the axially lower wall portions 46, 46 of the elastic body 16, which partially define the working fluid chambers 98, 98, are provided with recesses 123, 123 that are opposed to each other with the support shaft portion 20 of the first mounting member 14 interposed therebetween in the diametric direction in which the working fluid chambers 98, 98 are opposed to each other. These recesses 123, 123 function to partially reduce the wall thickness of the axially lower wall portions 46, 46, respectively, to thereby increase a spring ration in two mutually orthogonal diametrical directions of the engine mount 115 (i.e., the longitudinal direction and the lateral direction of the vehicle), and to suitably adjust the spring constant of the engine mount 10 in the axial direction as well.

Referring next to FIGS. 5–14, there is shown an engine mount 130 for use in an automotive vehicle, which is constructed according to a third preferred embodiment of the present invention. In the following description as to the third embodiment, the same reference numerals as used in the aforementioned embodiments will be used to identify the functionally corresponding elements, and redundant descriptions of those elements will not be provided.

Figure 7:
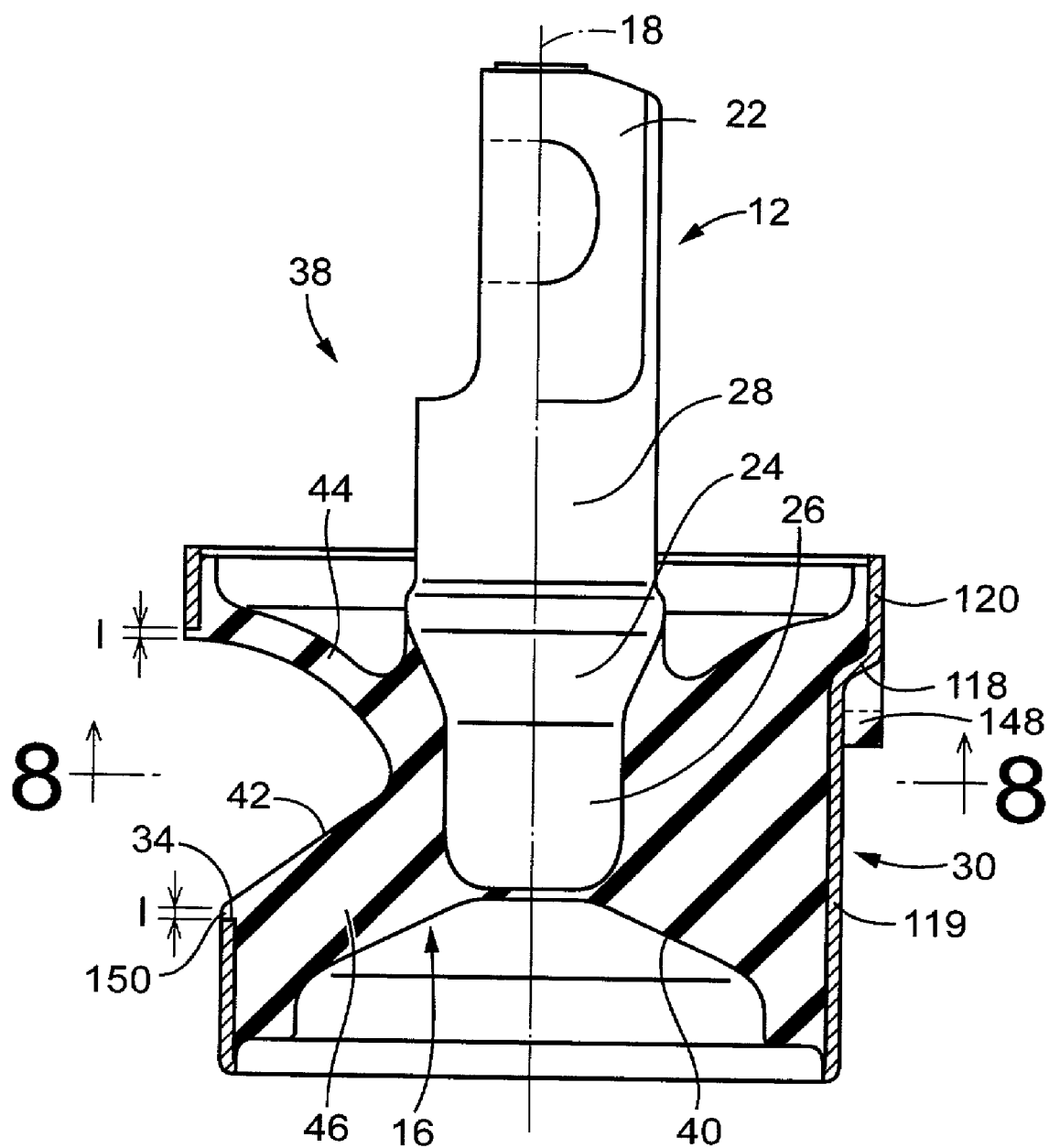
FIG. 7 is an axial cross sectional view of a integral vulcanized assembly of the engine mount of FIG. 5, the cross sectional view being taken along line 7—7 of FIG. 8.
Figure 8:
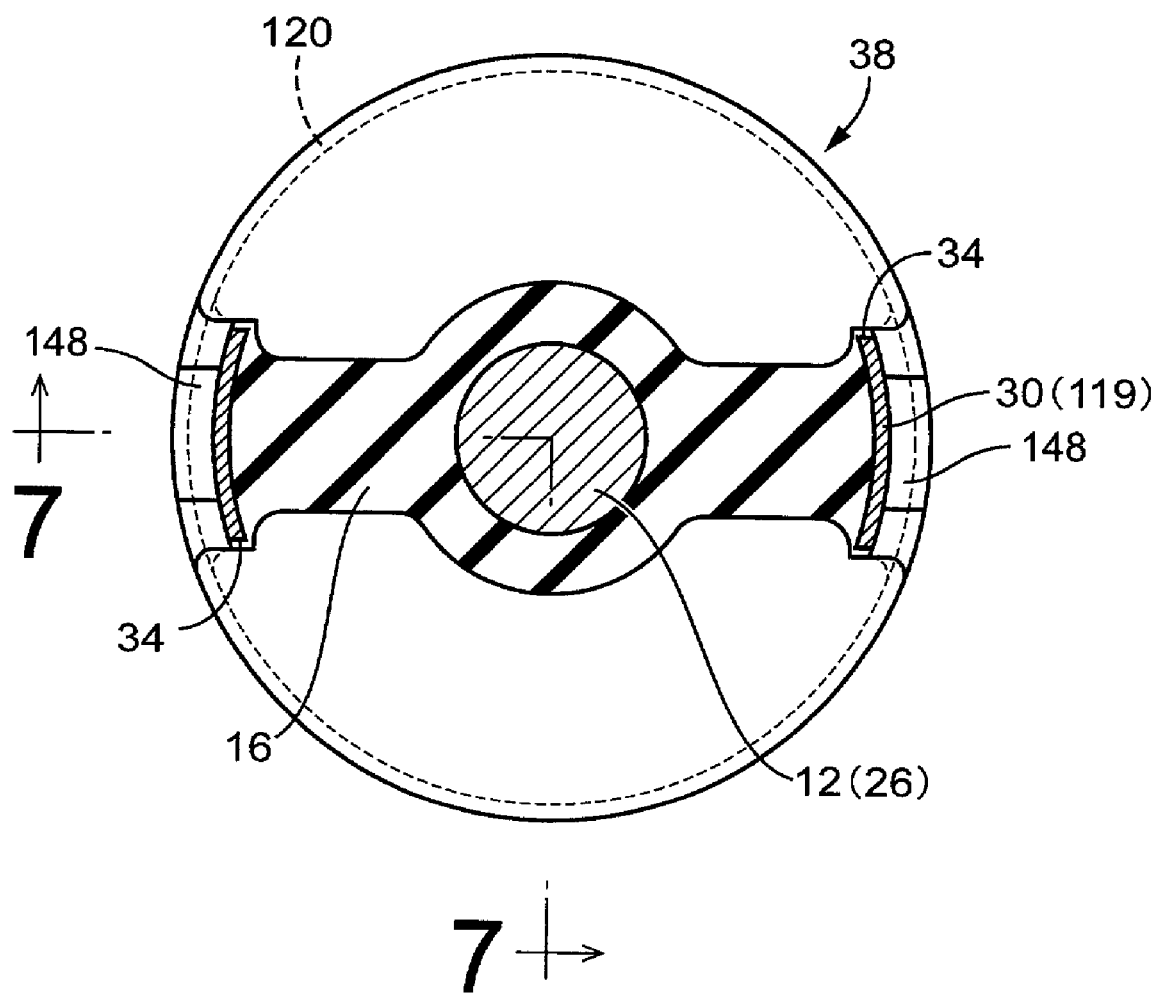
FIG. 8 is a cross sectional view taken along line 8—8 of FIG. 7.
Figure 9:
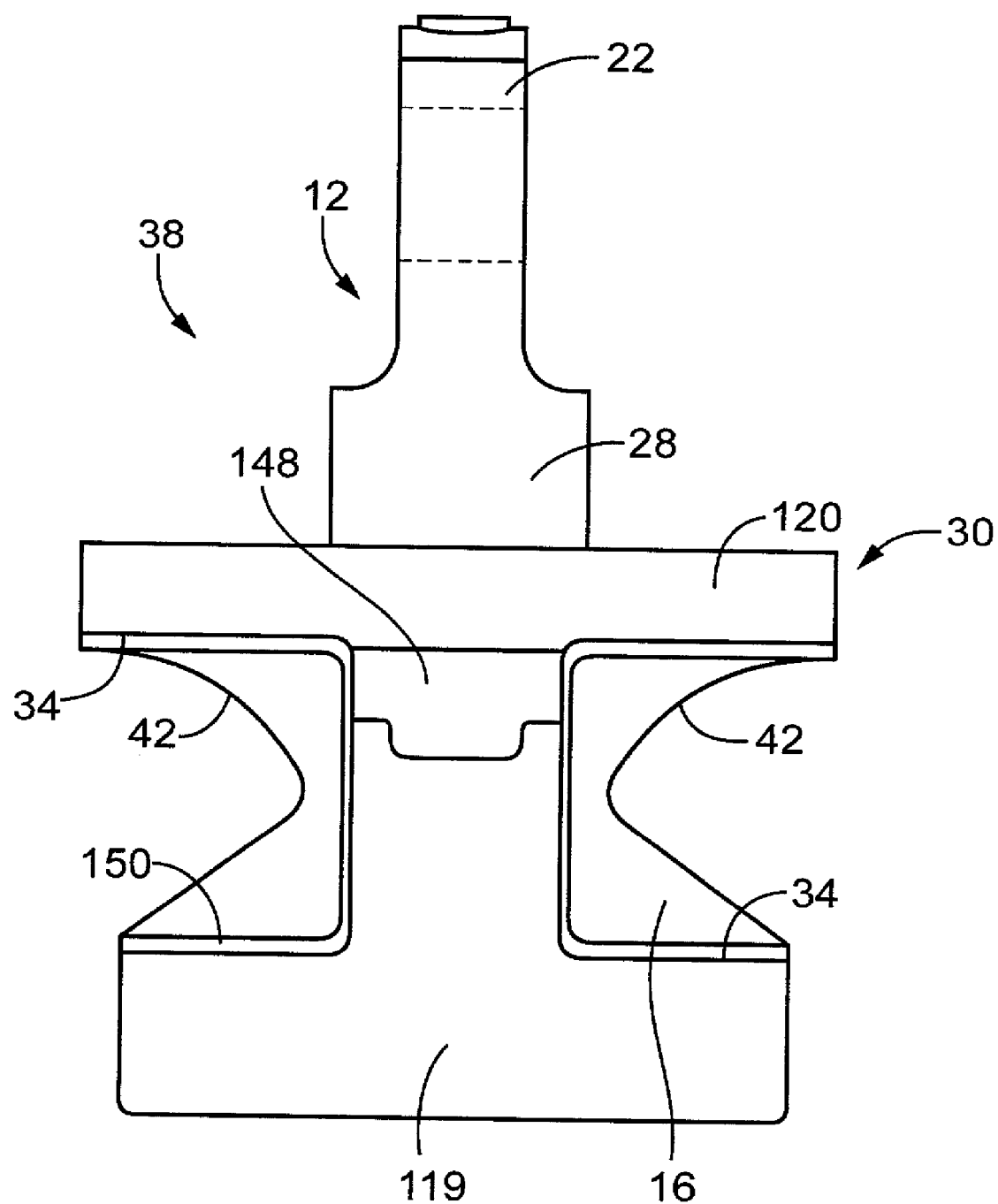
FIG. 9 is a front elevational view of the integral vulcanized assembly of FIG. 7.
Figure 10:
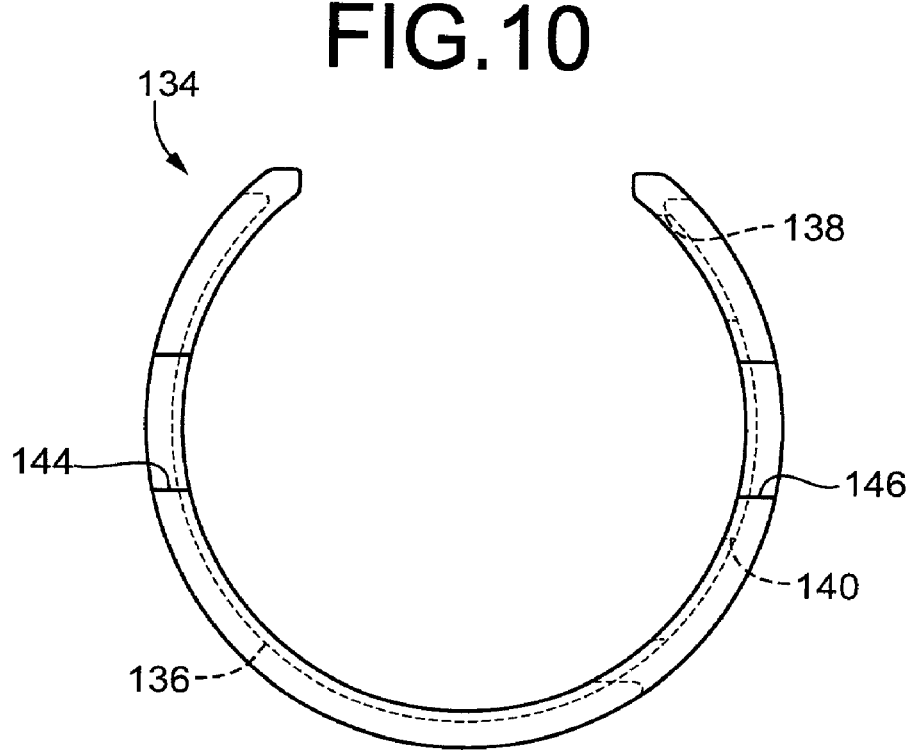
FIG. 10 is a top plan view of an orifice member of the engine mount of FIG. 5.
Figure 11:
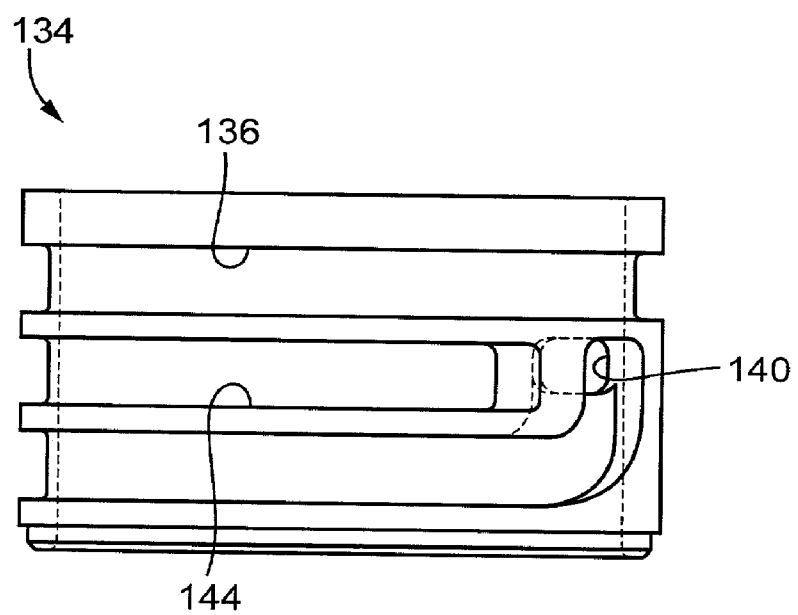
FIG. 11 is a front elevational view of the orifice member of FIG. 10.
Figure 12:
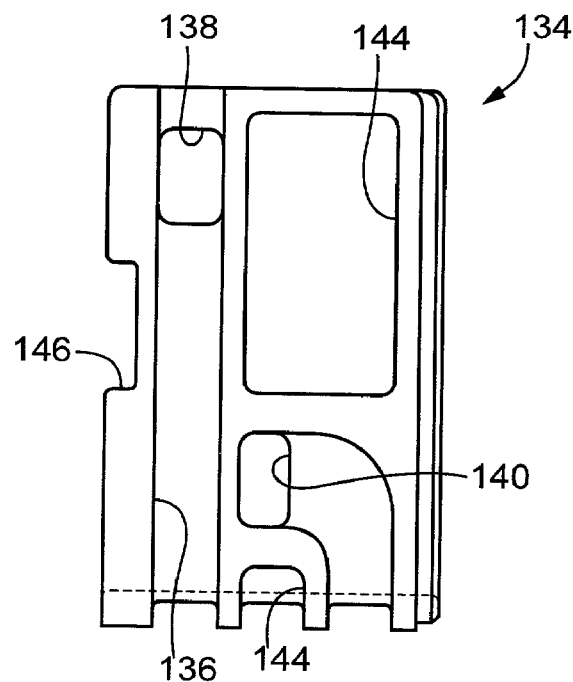
FIG. 12 is a right-side elevational view of the orifice member of FIG. 11.
Figure 13:
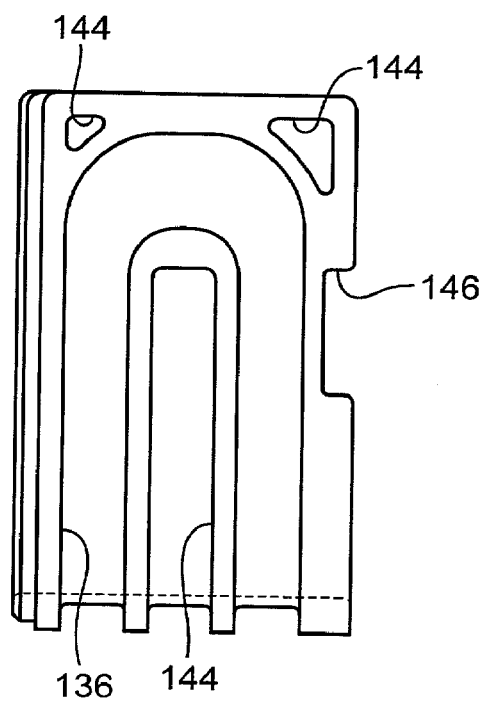
FIG. 13 is a left-side elevational view of the orifice member of FIG. 11.

In the engine mount 130 of the present embodiment, the elastic body 16 protrudes inside of each window 34 from the peripheral portion of each window 34 by a given length "I", as shown in FIG. 7, to thereby form a sealing-lip providing portion 150. The sealing-lip providing portion 150 is integrally formed with the elastic body 16 at the peripheral portion of each window 34 so as to extend over the substantially entire circumference of the window 34 with the substantially constant height dimension "I" and the substantially constant width dimension, as shown in FIG. 7.

Like the second embodiment, a cylindrical orifice member 134 is interposed between the large-diameter cylindrical portion 52 of the second mounting member 14 and the small diameter portion 119 of the metallic sleeve 30 in the radial direction. As is apparent from FIGS. 10–13, the orifice member 134 is a generally cylindrical member extending in its axial direction with a substantially constant arc shape in cross section and in its circumferential direction with a circumferential length larger than a half of its circumference (e.g., about three-fourths of the circumference, in the present embodiment). This orifice member 134 is formed of a rigid material, such as a synthetic resin material and a metallic material, and is dimensioned such that the inner diameter of the orifice member 134 is made slight larger than the outer diameter of the small diameter portion 119 of the metallic sleeve 30, while the outer diameter of the orifice member 134 is made substantially equal to the outer diameter of the large diameter portion 120 of the metallic sleeve 30. The orifice member 134 is radially outwardly mounted on the metallic sleeve 30 on the side of the small diameter portion, with its axially upper end portion extends to and located on the axially intermediate portion of the windows 34. The axially lower end portion of the orifice member 134, on the other hand, is held in abutting contact with the shoulder 50 of the second mounting member 14, while being compressed by and between the lower end portion of the small diameter portion of the metallic sleeve 30 and the large-diameter cylindrical portion of the second mounting member 14 over it entire circumference. Thus, the orifice member 134 is fixedly positioned to and assembled to the second mounting member 14.

The orifice member 134 is provided with a groove 136 extending reciprocatively and spirally in its circumferential direction and open in its outer circumferential surface. One of the opposite end of the groove 136 is connected to one of the two working fluid chambers 98 through a communication hole 138 formed through the bottom wall of the groove 136, while the other end of the groove 136 is connected to the other working fluid chamber 98 through a communication hole 140 formed through the bottom wall of the groove 136. The opening of the groove 136 is fluid-tightly closed by the large-diameter cylindrical portion of the second mounting member 14, thus forming a second orifice passage 142 for fluid communication between the two working fluid chambers 98, 98. In the engine mount 130 according to the present embodiment, the second orifice passage 142 is suitably tuned in its length, its cross sectional area, or the like, so that the engine mount 130 can exhibit a high vibration damping effect with respect to low frequency vibrations such as engine shakes, on the basis of the flow of the fluid flowing through the second orifice passage 142 between the two working fluid chambers 98, 98. Further, the orifice member 94 may have a cutout hole 144 having a variety of configurations and size, as needed.

Also, the orifice passage 134 is provided with positioning cutouts 146, 146 each having a rectangular shape and being open in its axially upper end face. While the orifice passage 134 is press-fitted onto the outer circumferential surface of the metallic sleeve 14, engaging projections 148, 148 are fixedly formed by an elastic body on the circumferential portion interposed between the pair of windows 34, 34 on the outer circumferential surface of the small diameter portion 119 of the metallic sleeve 30. The engaging projections 148, 148 extend in the axial direction (from the large diameter portion of the metallic sleeve 30). These positioning cutouts 146, 146 and the engaging projections 148, 148 are assembled together, for suitable positioning of the orifice member 134 relative to the integral vulcanized assembly in the circumferential direction.

In particular, the metallic sleeve 30 is subjected to a drawing operation, e.g., an all directional drawing, before being press-fitted into the cylindrical orifice member 134 so that the diameter of the metallic sleeve 30 is reduced so as to give the pre-compression in the radially inward direction to the elastic body 16. This application of the pre-compression to the elastic body 16 is effective to eliminate or minimize tensile-stress possibly occurred in the elastic body 16 upon vulcanization of the rubber material for forming the elastic body 16, resulting in improved load capacity and durability of the engine mount 130 of the present embodiment.

Figure 14:
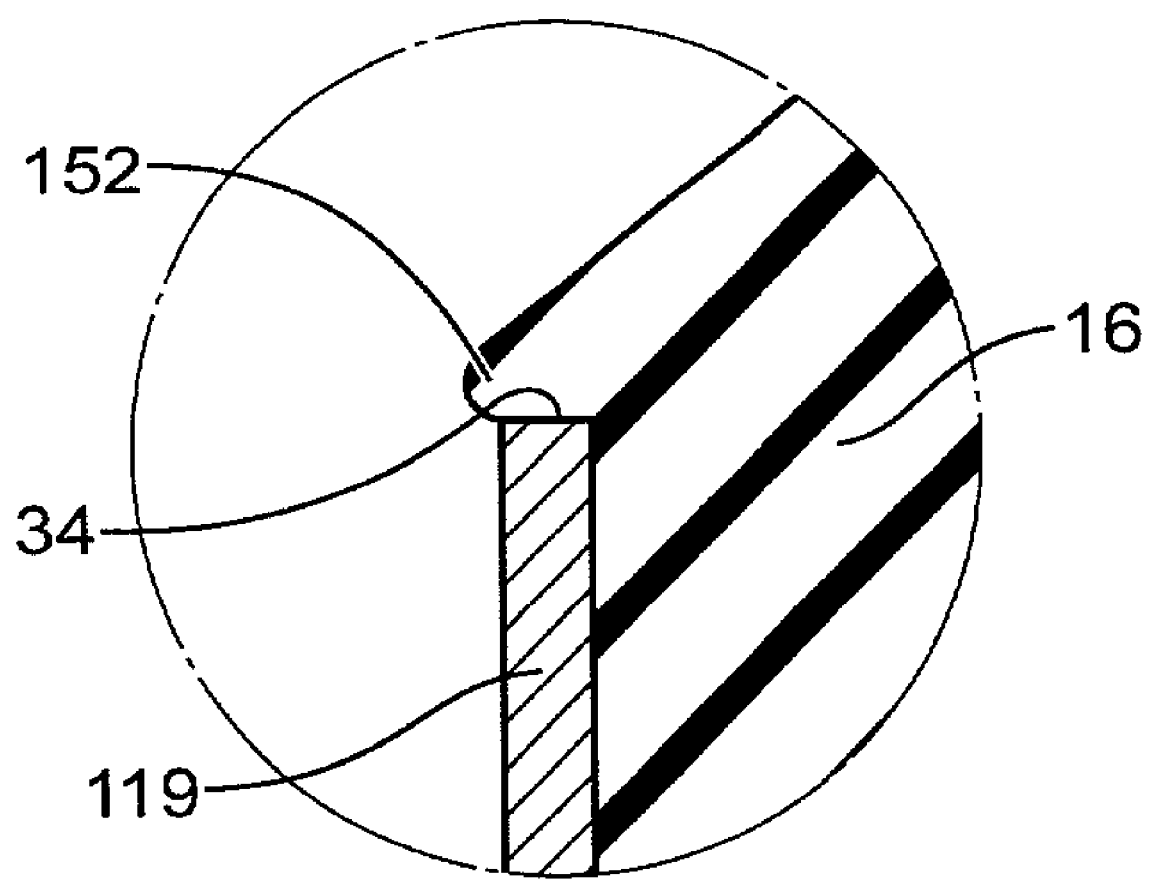
FIG. 14 is a fragmentally enlarged view of the engine mount of FIG. 5.

In addition, the drawing operation performed on the metallic sleeve 30 causes radially inward pressure acting on the outer circumferential surface of the elastic body 16, resulting in elastic deformation of the elastic body 16. As a result, the sealing lip providing portion 150 formed at the peripheral portion of each window 34 over its substantially entire circumference as the integral part of the elastic body 16 protrudes in the radially outward direction relative to the metallic sleeve 30, as shown in FIG. 14. Thus, there is provided a sealing lip 152 with a semi-circular shape in cross section, which protrudes inward of the window and radially outward of the outer circumferential surface of the metallic sleeve 30. The thus formed sealing lip 152 is forcedly pressed onto the inner circumferential surface of the cylindrical orifice member in the state where the cylindrical orifice member 134 is fixedly mounted on the metallic sleeve 30, thus assuring excellent fluid-tight sealing between the peripheral portion of each window 34 and the cylindrical orifice member 94.

In the present embodiment, the sealing lip 152 is formed in the axially upper portion of the peripheral portion of each window 34. Therefore, the sealing lip 152 is also forcedly pressed onto the inner circumferential surface of the second mounting member 12 with the second mounting member being mounted on the metallic sleeve 30, thus assuring a fluid-tight sealing between abutting surfaces of the opening end portion of the cylindrical portion of the second mounting member 14 and the large diameter portion of the metallic sleeve 30, too. In this embodiment, the sealing lip 152 is formed over a substantially entire circumference of each window 36.

In the engine mount 130 constructed as described above, the first mounting member 12 is fixed at its fixing portion 22 to the power unit (not shown) by means of a bolt extending through a fixing hole formed therethrough, while the second mounting member 14 is press-fitted into the bore of the cylindrical bracket 110 and fixed to the body (not shown) of the vehicle via the cylindrical bracket 110. Thus, the power unit is mounted on the body via the engine mount 130 in a vibration damping fashion, like the aforementioned embodiment. In particular, the engine mount 130 includes an inverted-cup shaped dust cover 154, which is bonded to and supported by the large diameter part 28 of the first mounting member 12 and covers the axially upper opening of the bracket 110 entirely.

With the engine mount 130 installed on the vehicle as described above, the pressure of the fluid in the pressure receiving chamber 76 is made different from that in the equilibrium chamber 78, upon application of a vibrational load in the substantially vertical direction. If the input vibration has a low frequency and large amplitude, like engine shakes, the fluid is forced to flow through the first orifice passage 86 between the pressure receiving chamber 76 and the equilibrium chamber 78, whereby the engine mount 130 can exhibit a desired vibration damping effect on the basis of the flows or resonance of the fluid flowing through the first orifice passage 86. If the input vibration has a high frequency and a small amplitude, like booming noises, fluid pressure variation induced in the pressure receiving chamber 76 is effectively absorbed or attenuated on the basis of the elastic deformation of the movable rubber plate 90, so that the engine mount 130 can exhibit a vibration isolating effect while exhibiting a low spring constant with the help of the elastic deformation of the movable rubber plate 90.

When the engine mount 130 installed in position is subjected to a vibrational load in the substantially horizontal direction, the pair of working fluid chambers 98, 98 cause a pressure difference relative to each other, causing flows of the fluid through the second orifice passage 142 between the two working fluid chambers 98, 98. Therefore, the engine mount 130 can exhibit a vibration damping effect on the basis of resonance of the fluid flowing through the second orifice passage 142.

It the present embodiment, the orifice member 134 is formed as a integral form and extends circumferentially with the circumferential length larger than a half of its circumference. This orifice member 134 can be easily assembled with the integral vulcanized assembly 38 by simply inserted onto the outer circumferential surface of the metallic sleeve 30 on the side of the small diameter portion 119. This arrangement makes it possible to eliminate a need for form the orifice member in a split structure upon assembling the orifice member, thus reducing the number of components. Thus, the engine mount 130 is made simple in construction and assures an improved efficiency in manufacture.

In addition, the cylindrical orifice member 134 stretches from the small diameter portion 119 of the metallic sleeve 30 to the axially intermediate portion of the windows 34, making it possible to form the orifice member with a sufficiently large length, in other words, with an enhanced degree of freedom in tuning the orifice passage 142.

With the cylindrical orifice member 134 press-fitted on the metallic member 30, the sealing lip 152 provided at the peripheral portion of each window 34 protruding radially outwardly from the metallic sleeve, is forcedly pressed onto the inner circumferential surface of the cylindrical orifice member 134. Therefore, enhanced fluid-tight sealing between the abutting surfaces of the metallic sleeve 30 and the cylindrical orifice member 134 can be effectively assured without needing a special treatment for the cylindrical orifice member 134 for improving the fluid tight sealing, e.g., the all directional drawings performed on the cylindrical orifice member 134. As a result, undesirable short of the orifice passages and leakage of the non-compressible fluid is effectively prevented. Thus, the engine mount 130 of the present embodiment is capable of exhibiting a desired vibration damping effect with high stability, while assuring a high reliability thereof.

Further, the sealing lip 152 is formed by utilizing the sealing-lip providing portion 150 by performing the drawing operation on the metallic sleeve 30 so as to protrude the sealing lip providing portion 150 to the radially outward portion of the metallic sleeve 30. This arrangement eliminates a need for a minor change or arrangement of the mold for molding the elastic body 16 to form the sealing lip 110, while making it possible to surely cut the rubber material in the peripheral portion of the window 34 of the metallic sleeve, upon forming by vulcanization the elastic body 16. Thus effectively preventing undesirable extension of the elastic body 16 to the outer circumferential surface of the metallic sleeve 30 and the resultant deterioration of the fluid tightness of the working fluid chambers 98, 98.

Yet further, the sealing lips 152 is forcedly pressed onto the cylindrical orifice member 30, thus assuring excellent fluid-tight sealing in the pressure receiving chamber 76 and the equilibrium chamber 78 relative to the pair of working fluid chambers 98, 98, too.

Figure 15:
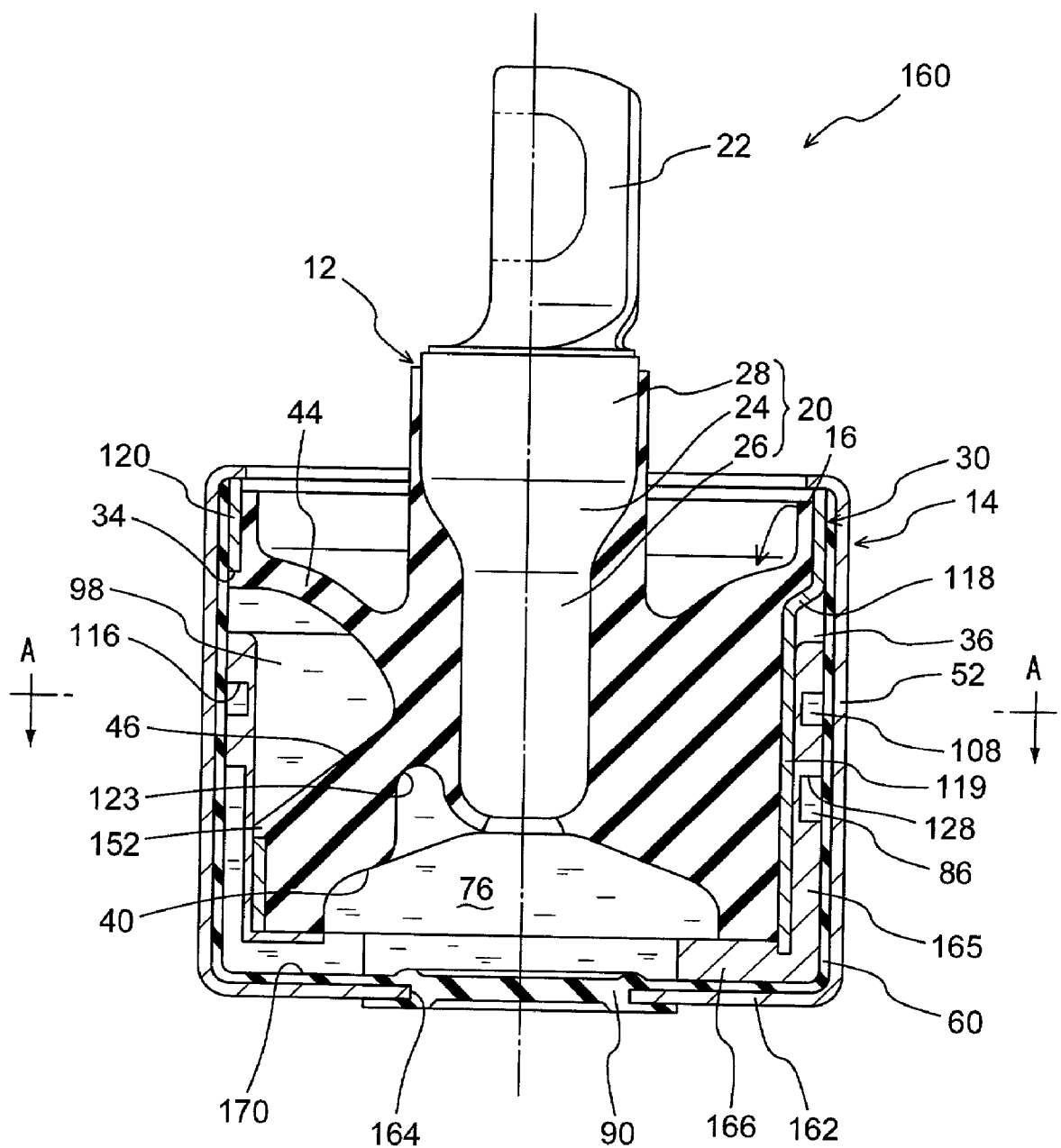
FIG. 15 is an elevational view in axial or vertical cross section of a fluid-filled vibration-damping device in the form of an engine mount constructed according to a fourth embodiment of the present invention, the view corresponding to FIG. 3.
Figure 16:
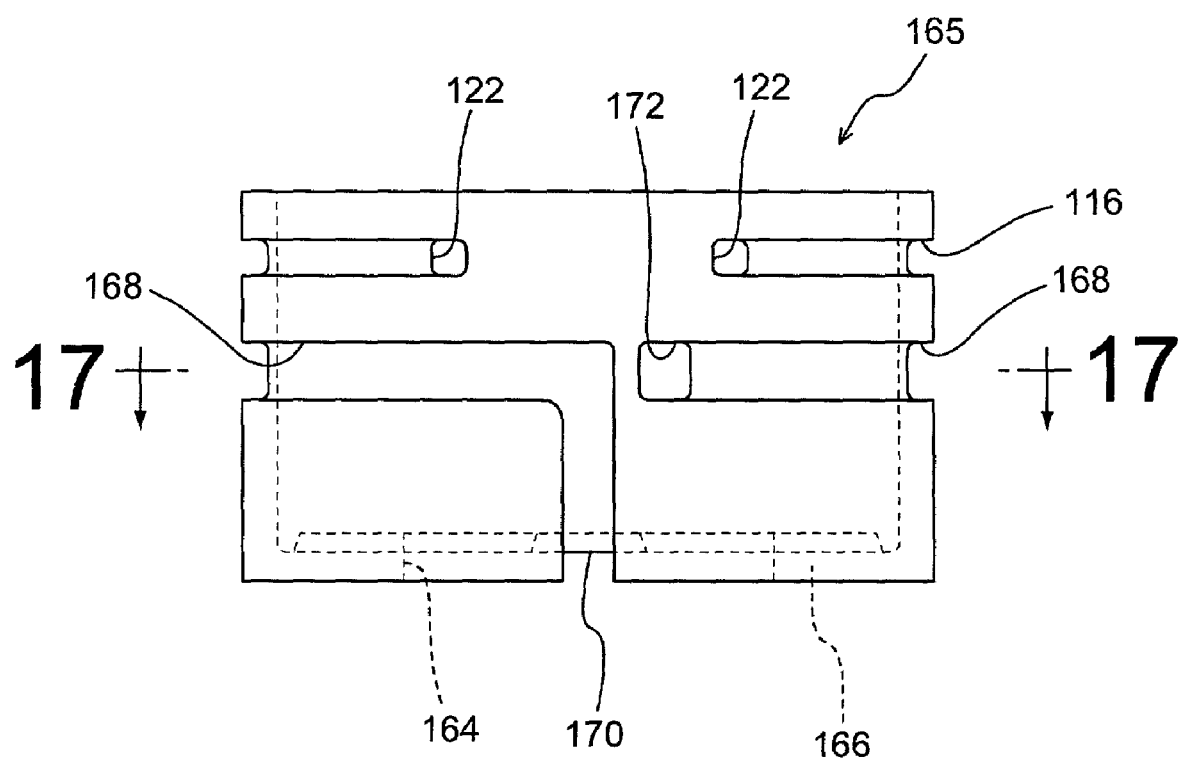
FIG. 16 is a front elevational view of an orifice member of the engine mount of FIG. 15.
Figure 17:
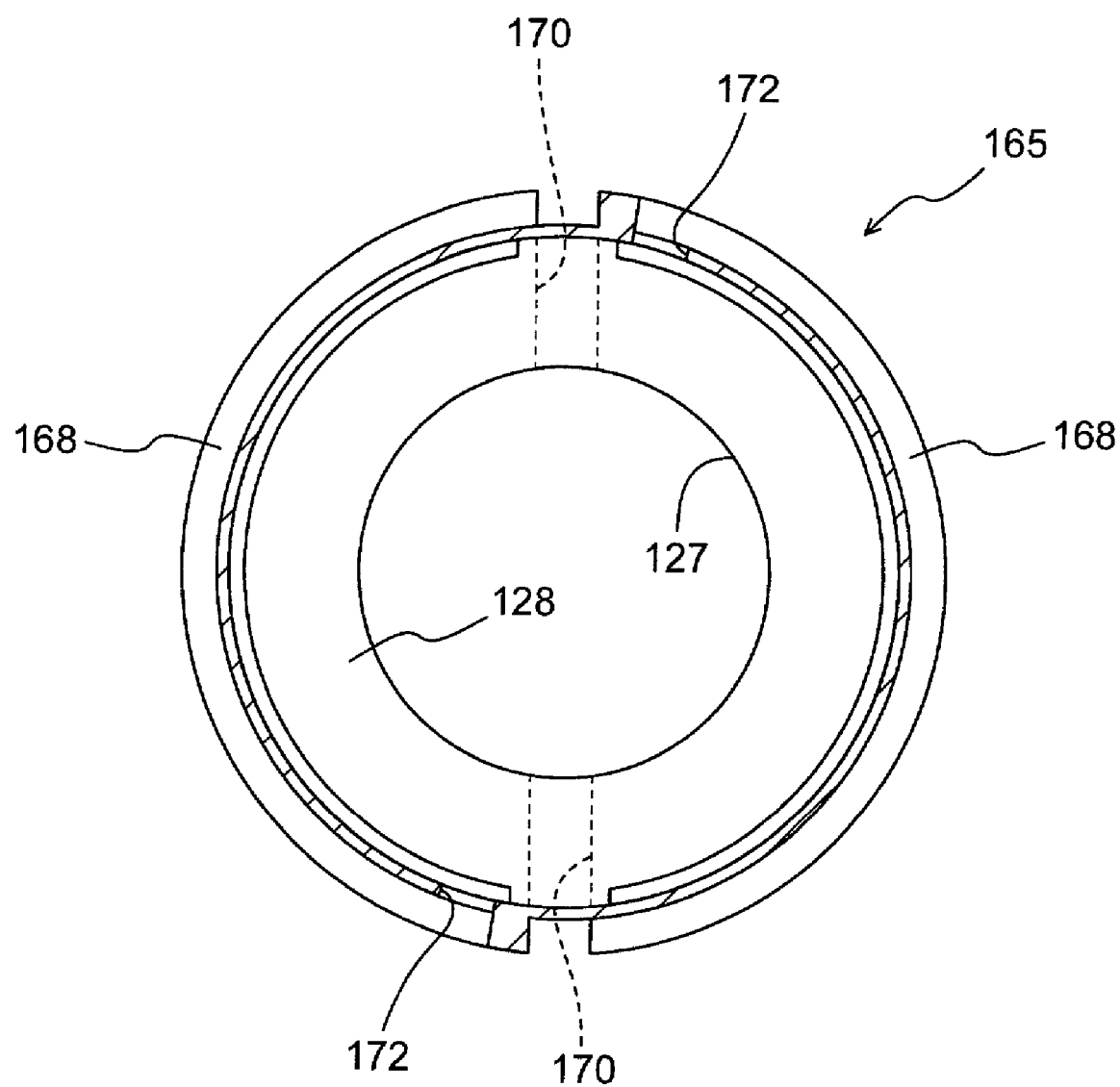
FIG. 17 is a cross sectional view taken along line 17—17 of FIG. 16.

Referring next to FIGS. 15–17, there is shown an engine mount 160 for use in an automotive vehicle, which is constructed according to a fourth embodiment of the present invention. In the following description as to the fourth embodiment, the same reference numerals as used in the aforementioned embodiments will be used to identify the functionally corresponding elements, and redundant descriptions of those elements will not be provided. In addition, since a cross sectional view taken along line A—A of FIG. 15 is appeared similarly to FIG. 4 as to the second embodiment, it will be omitted to depict this cross sectional view.

In the engine mount 160 of the present embodiment the second mounting member 14 is composed of a cylindrical cup shaped member with a relatively large diameter. The pressure-receiving chamber 76 is formed between a bottom wall portion 162 of the second mounting member 14 and the recess 40 of the elastic body 16. Namely, the engine mount 160 has no equilibrium chamber that is adopted in the aforementioned embodiments.

The bottom wall portion 162 of the second mounting member 14 has a circular through hole 164 formed through its central portion. A movable rubber plate 90 is disposed in the central through hole 164 so as to extend in its horizontal attitude. The movable rubber plate 90 has a disk shaped rubber member with a given thickness, and is bonded at its peripheral portion to the periphery of the central through hole 164 in the process of vulcanization of a rubber material for forming the movable rubber plate 90. The movable rubber plate 90 disposed in the central through hole 164 as described above is adapted to receive at its upper surface the pressure of the fluid in the pressure receiving chamber 76 and at its lower surface the atmospheric pressure. In operation, the pressure variation of the fluid in the pressure-receiving chamber 76 due to the input vibrational load in the axial direction can be absorbed or reduced with the help of the elastic deformation of the movable rubber plate 90. The elasticity of the movable rubber plate 90 suitably restricts its own elastic deformation so that the movable rubber plate 90 effectively absorb or reduce the pressure variation of the pressure receiving chamber 76 upon application of the high-frequency small-amplitude vibrations, while permitting an effective pressure variation of the fluid in the pressure receiving chamber 76 upon application of low-frequency large-amplitude vibrations.

As is apparent from FIGS. 16 and 17, the orifice member 165 includes an annular protrusion 166 with an inward flange shape, which is integrally formed at and protrudes radially inwardly from the axially lower end portion of the orifice member 165 by a given radial distance. The inner peripheral portion of the annular protrusion 166 extends close to the central through hole 164 formed through a bottom wall portion 162 of the second mounting member 14. This annular protrusion 166 is held in close contact with the bottom wall portion 162 of the second mounting member 14 with its outer peripheral portion being forcedly held by and between the axially lower end portions of the metallic sleeve 30 as well as the elastic body 16 and the bottom wall portion 162 of the second mounting member 14 in the axial direction of the engine mount 160. Thus, the orifice member 165 is fixedly assembled within the bore of the second mounting member 14. In this state, the inner peripheral portion of the annular protrusion 166 is located in the pressure-receiving chamber 76.

Like the orifice member 121 in the second embodiment, the orifice member 165 has a circumferential groove 116 open in its outer circumferential surface and formed at its axially intermediate portion so as to extend circumferentially with a circumferential length that is slightly smaller than a circumference of the orifice member 165.

The orifice member 165 also has a pair of circumferential grooves 168, 168 each being open in its outer circumferential surface and located axially downward of the circumferential groove 116, while extending in the circumferential direction with a circumferential length that is equal to a half of the circumference of the orifice member 165. Ones of circumferentially opposite ends of the circumferential grooves 168, 168 extend axially downwardly to communicate with respective radial grooves 170, 170 formed in the annular protrusion 166, and open in the inner peripheral portion of the annular protrusion 166 through the respective radial grooves 170, 170. The other ends of the circumferential grooves 168, 168 are open in the inner circumferential surface of the orifice member 165 through respective communication holes 172, 172 formed through the bottom wall portion of the circumferential grooves 168, 168.

Referring back to FIG. 15, the outer circumferential portion of the orifice member 165 as well as the axially outer surface of the annular protrusion 166 is held in close contact with the inner circumferential surfaces of the large diameter cylindrical portion 52 and the bottom wall portion 162 of the second mounting member 14. Thus, the opening of the circumferential grooves 168, 168 and the radial grooves 170, 170 are fluid tightly closed by the large diameter cylindrical portion 52 and the bottom wall portion 162 of the second mounting member 14, thereby providing two first orifice passages 86, 86 that are independent of each other and serve for connecting the working fluid chambers 98, 98 to the pressure receiving chamber 76, respectively. Like the aforementioned embodiment, the opening of the circumferential groove 116 is fluid-tightly closed by the cylindrical portion 52 of the second mounting member 14, too.

The engine mount 160 constructed as described above is installed on the vehicle in the same manner as the aforementioned embodiments, and is subjected to vibrational loads primarily in its axial or vertical direction and its radial direction parallel to the longitudinal direction of the vehicle. When the engine mount 160 is subjected to a radial vibrational load in the radial direction, the engine mount 160 is capable of exhibiting an excellent vibration damping effect with respect to the input vibrational load on the basis of flows of the fluid through the second orifice passage 108 between the two working fluid chambers 98, 98, like in the second embodiment. On the other hand, when the engine mount 160 is subjected to an axial vibrational load, the pressure variation of the pressure receiving chamber 76 relative to the working fluid chambers 98, 98 is induced by the elastic deformation of the elastic body 16, thus causing flows of the fluid through the two first orifice passages 86, 86 between the pressure receiving chamber 76 and the respective working fluid chambers 98, 98. Thus, the engine mount 160 is also capable of exhibiting an excellent vibration damping effect with respect to the input vibrational load in the axial direction on the basis of the flows of the fluid through the two first orifice passages 86, 86. In addition, the engine mount 160 of the present embodiment is capable of exhibiting a low spring constant upon application of a vibrational load having frequency higher than a tuning frequency of the first orifice passages 86 with the help of elastic deformation of the movable rubber plate 90 so as to absorb the pressure variation of the fluid in the pressure receiving chamber 76.

As is understood from the aforementioned description, the engine mount 160 of the present embodiment can exhibit an excellent vibration damping effect with respect to vibrations applied thereto in the vertical and lengthwise directions of the vehicle, on the basis of the flows of the fluid through the first and second orifice passages, like in the engine mount 115 of the second embodiment. In addition, the engine mount 160 of the present embodiment, particularly, constitutes an auxiliary fluid chamber by utilizing the working fluid chambers 98, 98, whereby the engine mount 124 can be made compact in overall size.

Since the engine mount 160 of the present embodiment is made compact in its axial dimension, the fixing portion of the second mounting member 14 to the body of the vehicle can be located closer to the elastic support center of the elastic body 16 as much as possible, for example, when the engine mount 160 is mounted on the body of the vehicle with the axially lower end portion of the second mounting member 14 fixed to the body of the vehicle through a cylindrical bracket, like in the first and third embodiments. This arrangement permits a decrease in moment acting on the fixing portion of the second mounting member 14 to the body of the vehicle, and improved strengthen and durability of the fixing portion of the second mounting member to the body of the vehicle.

While the presently preferred embodiments of this invention have been described in detail for illustrative purpose only, it is to be understood that the present invention is not limited to the details of the illustrated embodiments, but may be embodied with various changes, modifications and improvements.

For instance, the specific structures, lengths, cross sectional areas or the like may not be limited to the illustrated embodiments, but may be suitably determined taking into consideration required damping characteristics of the engine mount 10. These first and/or second orifice passages may also be tuned to exhibit an excellent vibration damping effect with respect to engine idling vibrations, for example.

While the illustrated engine mounts includes the movable rubber plate 90 partially defining the pressure receiving chamber 76 and functioning to absorb the pressure variation of the fluid in the pressure receiving chamber upon application of high frequency vibrations, the movable rubber plate 90 is not essential to practice the present invention.

In the illustrated embodiment, the sealing lips 152 are formed so as to protrude radially outward of the metallic sleeve 30, by simply performing a drawing operation on the metallic sleeve. However, a variety of possible methods are adoptable for forming the sealing lips 152, without being limited by the illustrated embodiment. For instance, the sealing lips 152 may be formed integrally with the elastic body by vulcanization. Alternatively, the sealing lips 152 may be formed by vulcanization so as to slightly protrudes radially outward of the metallic sleeve 30 by vulcanization, and then is protruded further by the drawing operation performed on the metallic sleeve 30. It should be appreciated that the sealing lips 152 adopted in the third and fourth embodiments may be suitable applicable to the first and second embodiment, likewise.

While the illustrated embodiments of the fluid-filled vibration damping device of the present invention takes the form of the engine mounts for an automotive vehicle, especially for supporting the transversely mounted engine of the FF-type vehicle for the illustrative purpose only, the principle of the present invention is equally applicable to various other types of engine mount, a body mount, a differential mount for use on a motor vehicle, and other fluid-filled vibration damping devices for use in various devices other than those for the automotive vehicle.

It is also to be understood that the present invention may be embodied with various other changes, modification sand improvements, which may occur to those skilled in the art, without departing from the spirit and scope of the invention defined in the following claims.

What is claimed is:

1. A fluid-filled vibration-damping device for connecting a power unit and a body of a vehicle in vibration damping fashion comprising:

a first mounting member of shaft shape having a support shaft portion at one axial end portion thereof and a fixing portion at an other axial end portion thereof, said first mounting member being attached at the fixing portion to the power unit;

a second mounting member having a cylindrical portion, said second mounting member being disposed relative to said first mounting member such that said first mounting member is located on a side of an opening portion of an axially upper end of said cylindrical portion of said second mounting member with an axial spacing therebetween and with said supporting shaft portion thereof axially inserted into said cylindrical portion of said second mounting member and said fixing portion thereof axially upwardly protruded from the one of axially opposite ends of said cylindrical portion, said second mounting member being attached to the body of the vehicle;

an elastic body elastically connecting said support shaft portion of said first mounting member and said cylindrical portion of said second mounting member so that said opening portion of said one of axially opposite ends of said cylindrical portion of said second mounting member is fluid-tightly closed by said elastic body;

a primary fluid chamber formed in said cylindrical portion of said second mounting member and located axially inwardly of said first mounting member, while being partially defined by said elastic body and filled with a non-compressible fluid;

an auxiliary fluid chamber filled with said non-compressible fluid whose pressure varies relative to a pressure of said fluid filling said primary fluid chamber upon application of an axial vibrational load between said first mounting member and said second mounting member;

a first orifice passage for fluid communication between said primary and auxiliary fluid chambers;

a pair of working fluid chambers formed at respective circumferential portions of said elastic body that are opposed to each other in a diametric direction of said elastic body, so as to extend circumferentially with a circumferential length smaller than a half of a circumference of said elastic body, said pair of working fluid chambers being filled with said non-compressible fluid; and a second orifice passage for fluid communication between said pair of working fluid chambers, wherein each of said pair of working fluid chambers formed in said elastic body is partially defined by an axially outer elastic wall portion and an axially inner elastic wall portion having a spring constant in a radial direction perpendicular to said axial direction of said cylindrical portion of said second mounting member, which is larger than that of said axially outer wall portion in said radial direction, and wherein said axially outer elastic wall portion of each of said pair of working fluid chambers has elastic center line that extend radially outwardly while inclining to an axially upward direction so that said outer elastic wall portion extends substantially straightly in a diagonally upward direction from a radially inner portion thereof to a radially outer portion thereof, and an axially outer end face of the rubber elastic body extends substantially straightly in the diagonally upward direction from a radially inner portion thereof to an radially outer portion thereof, across an entire circumference of the rubber elastic body, in order to locate an elastic support center of the vibration damping device against an input vibrational load in a diametric direction in which the pair of working fluid chambers are opposed to each other on an axially lower end portion of the support shaft portion.

2. A fluid-filled vibration damping device according to claim 1, wherein each of said working fluid chamber has said axially inner elastic wall portion whose axial wall thickness is made larger than that of said axially outer elastic wall portion of said working fluid chamber.

3. A fluid-filled vibration-damping device according to claim 1, wherein said axially inner elastic wall portions of each of said pair of working fluid chambers interposed between said first and second mounting members, has a free length that is smaller than a free length of said axially outer elastic wall portions interposed between said first and second mounting members.

4. A fluid-filled vibration damping device according to claim 1, wherein said elastic body is bonded to said support shaft portion of said first mounting member in a process of vulcanization of a rubber material for forming said elastic body, and has a pair of pockets formed at respective circumferential portions thereof that are opposed to each other in a diametric direction thereof with said support shaft portion of said first mounting member interposed therebetween, said vibration damping device further comprising:

a cylindrical metallic sleeve having a pair of windows opposed to each other in a diametric direction thereof and being bonded on an outer circumferential surface of said elastic body in said process of vulcanization so that said pockets of said elastic body are open in an outer circumferential surface of said metallic sleeve through said windows, respectively, wherein said metallic sleeve is press-fitted into a bore of said cylindrical portion of said second mounting member so tat openings of said pair of pockets are fluid-tightly closed by said cylindrical portion of said second mounting member to thereby providing said pair of working fluid chambers.

5. A fluid-filled vibration-damping device according to claim 4, wherein said metallic sleeve includes a large-diameter annular portion and a small diameter annular portion located on axially opposite sides of a shoulder portion formed at an axially intermediate portion thereof, said large-diameter annular portion being bonded in said process of vulcanization to an outer circumferential surface of said axially outer elastic wall portions of said working fluid chambers, and said small-diameter annular portion being bonded in said process of vulcanization to an outer circumferential surface of said axially inner elastic wall portions of said working fluid chambers, said vibration damping device further comprising:

a generally cylindrical orifice member disposed radially outwardly on said small-diameter annular portion of said metallic sleeve such that one of axially opposite end portions of said generally cylindrical orifice member is forcedly held by and between said small-diameter annular portion and said cylindrical portion of said second mounting member, and another one of said axially opposite end portions of said generally cylindrical orifice member extends to said working fluid chambers along an inner circumferential surface of said cylindrical portion of said second mounting member so as to at least partially define said second orifice passage for fluid communication between said pair of working fluid chambers.

6. A fluid-filled vibration-damping device according to claim 5, wherein said axially outer elastic wall portions of said pair of working fluid chambers have an expansion spring constant that is made smaller than that of said axially inner elastic wall portions of said pair of working fluid chambers, and two first orifice passages are provided, while said primary fluid chamber is held in fluid communication with said pair of working fluid chambers through said two first orifice passages, respectively, so that said pair of working fluid chambers function as said auxiliary fluid chamber, and wherein said generally cylindrical orifice member further includes an annular protrusion integrally formed at and protrudes radially inwardly from said one of axially opposite end portions thereof so that an inner peripheral portion of said annular protrusion extends to said primary fluid chamber, said generally cylindrical orifice member being adapted to at least partially define said two first orifice passages for fluid communication between the said primary fluid chamber and said pair of working fluid chambers, respectively, as well as said second orifice passage for fluid communication between said pair of working fluid chambers.

7. A fluid-filled vibration-damping device according to claim 1, further comprising:
a partition member disposed at an axially intermediate portion of said cylindrical wall portion of said second mounting member to form said primary fluid chamber on one of axially opposite sides thereof and said auxiliary fluid chamber on an other one of axially opposite sides thereof, wherein said auxiliary fluid chamber is partially defined by a flexible layer.

8. A fluid-filled vibration-damping device according to claim 1, wherein said axially outer elastic wall portions of said pair of working fluid chambers have an expansion spring constant that is made smaller than that of said axially inner elastic wall portions of said pair of working fluid chambers, and two first orifice passages are provided, while said primary fluid chamber are held in fluid communication with said pair of working fluid chambers through said two first orifice passages, respectively, so that said pair of working fluid chambers constitute said auxiliary fluid chamber.

9. A fluid-filled vibration-damping device according to claim 1, wherein said first mounting member is fixable to one of said two members at an protruding end portion thereof, which protrudes axially outwardly from said cylindrical portion of said second mounting member, and said second mounting member is fixable to the other of said two members on a side of said other one of axially opposite end portions of said cylindrical portion thereof remote from said first mounting member.

10. A fluid-filled vibration damping device according to claim 9, wherein said vibration-damping device is fixed to said other one of said two members via a cylindrical bracket member such that said vibration damping device is press-fitted into a bore of said cylindrical bracket member and said bracket member is fixed to said other one of said two members at one of axially opposite end portions thereof, which is located remote from said first mounting member of said vibration damping device.

11. A fluid-filled vibration-damping device according to claim 1, wherein said elastic center line of said axially outer elastic wall portions incline with respect to an central axis of said vibration-damping device with an angle that is larger than that of elastic center lines of said axially inner elastic wall portions.

12. A fluid-filled vibration-damping device according to claim 1, wherein said axially outer elastic wall portions have axially opposite surfaces that extend parallel to each other.

13. A fluid-filled vibration-damping device for connecting two members in vibration damping fashion comprising:
a first mounting member having a support shaft portion;
a second mounting member having a cylindrical portion, said second mounting member being disposed relative to said first mounting member such that said first mounting member is located on a side of an opening portion of one of axially opposite ends of said cylindrical portion of said second mounting member with an axial spacing therebetween and with said supporting shaft portion thereof axially inserted into said cylindrical portion of said second mounting member;
an elastic body elastically connecting said support shaft portion of said first mounting member and said cylindrical portion of said second mounting member so that said opening portion of said one of axially opposite ends of said cylindrical portion of said second mounting member is fluid-tightly closed by said elastic body;
a primary fluid chamber formed in said cylindrical portion of said second mounting member and located axially inwardly of said first mounting member, while being partially defined by said elastic body and filled with a non-compressible fluid;
an auxiliary fluid chamber filled with said non-compressible fluid whose pressure varies relative to a pressure of said fluid filling said primary fluid chamber upon application of an axial vibrational load between said first mounting member and said second mounting member;
a first orifice passage for fluid communication between said primary and auxiliary fluid chambers;
a pair of working fluid chambers formed at respective circumferential portions of said elastic body that are opposed to each other in a diametric direction of said elastic body, so as to extend circumferentially with a circumferential length smaller than a half of a circumference of said elastic body, said pair of working fluid chambers being filled with said non-compressible fluid;
a second orifice passage for fluid communication between said pair of working fluid chambers,
wherein each of said pair of working fluid chambers formed in said elastic body is partially defined by an axially outer elastic wall portion and an axially inner elastic wall portion, said axially inner elastic wall portion having a spring constant in a radial direction perpendicular to said axial direction of said cylindrical portion of said second mounting member, which is larger than that of said axially outer wall portion in said radial direction,
wherein said axially outer elastic wall portion of each of said pair of working fluid chambers has elastic center line that extend axially outwardly and radially outwardly,
wherein said elastic body is bonded to said support shaft portion of said first mounting member in a process of vulcanization of a rubber material for forming said elastic body, and has a pair of pockets formed at respective circumferential portions thereof that are opposed to each other in a diametric direction thereof with said support shaft portion of said first mounting member interposed therebetween,
a cylindrical metallic sleeve having a pair of windows opposed to each other in a diametric direction thereof and being bonded on an outer circumferential surface of said elastic body in said process of vulcanization so that said pockets of said elastic body are open in an outer circumferential surface of said metallic sleeve through said windows, respectively, wherein said metallic sleeve is press-fitted into a bore of said cylindrical portion of said second mounting member so that openings of said pair of pockets are fluid-tightly closed by said cylindrical portion of said second mounting member to thereby providing said pair of working fluid chambers, wherein said metallic sleeve includes a large-diameter annular portion and a small diameter annular portion located on axially opposite sides of a shoulder portion formed at an axially intermediate portion thereof, said large-diameter annular portion being bonded in said process of vulcanization to an outer circumferential surface of said axially outer elastic wall portions of said working fluid chambers, and said small-diameter annular portion being bonded in said process of vulcanization to an outer circumferential surface of said axially inner elastic wall portions of said working fluid chambers, a generally cylindrical orifice member disposed radially outwardly on said small-diameter annular portion of said metallic sleeve such that one of axially opposite end portions of said generally cylindrical orifice member is forcedly held by and between said small-diameter annular portion and said cylindrical portion of said second mounting member, and another one of said axially opposite end portions of said generally cylindrical orifice member extends to said working fluid chambers along an inner circumferential surface of said cylindrical portion of said second mounting member so as to at least partially define said second orifice passage for fluid communication between said pair of working fluid chambers, and wherein said elastic body protrudes inside at least one of said windows of said metallic sleeve from peripheral portions of said at least one of said windows, while protruding radially outwardly from an outer circumferential surface of said metallic sleeve so as to form a sealing lip to be forcedly pressed onto an inner circumferential surface of said generally cylindrical orifice member.

14. A fluid-filled vibration-damping device according to claim 13, wherein said sealing lip is formed over a substantially entire peripheral portion of said at least one of said windows.

15. A fluid-filled vibration-damping device according to claim 13, wherein said other one of said axially opposite end portions of said generally cylindrical orifice member is located at an axially intermediate portion of said windows.

16. A fluid-filled vibration-damping device according to claim 13, wherein said second mounting member has a generally cylindrical cup shape and is disposed relative to said first mounting member such that said support shaft portion of said fast mounting member is inserted into a bore of said second mounting member from an open end portion of said second mounting member, while is fluid-tightly press-fined at said open end portion thereof onto said large diameter annular portion of said metallic sleeve, and said generally cylindrical orifice member is positioned relative to and supported by said second mounting member with said one of axially opposite end portions thereof being held in abutting contact with a bottom wall portion of said second mounting member, and wherein said elastic body and said bottom wall portion of said second mounting member cooperate to form therebetween the primary fluid chamber to be independent of the pair of working fluid chambers, and said first orifice passage comprising two first orifice passages that connect the primary fluid chamber to the working fluid chambers, respectively.

17. A fluid-filled vibration-damping device according to claim 13, wherein said second mounting member has a generally cylindrical cup shape and is disposed relative to said first mounting member such that said support shaft portion of said first mounting member is inserted into a bore of said cylindrical portion of said second mounting member from an open end portion of said second mounting member, while is fluid-tightly press-fitted at said open end portion thereof onto said large diameter annular portion of said metallic sleeve, and said generally cylindrical orifice member is positioned relative to and supported by said second mounting member with said one of axially opposite end portions thereof being held in abutting contact with a bottom wall portion of said second mounting member, said bottom wall portion of said second mounting member being at least partially formed by a flexible layer, said vibration damping device further including a partition member disposed between said elastic body and said flexible layer and cooperating with said elastic body to form said primary fluid chamber on one of axially opposite sides thereof, and with said flexible layer to form said auxiliary fluid chamber on an other one of axially opposite sides thereof, and wherein said tint orifice passage for fluid communication between said primary fluid chamber and said auxiliary fluid chamber is formed in a radially outer portion of said partition member.

18. A fluid-filled vibration-damping device according to claim 13, wherein said first mounting member, said elastic body and said metallic sleeve cooperate to provide an integral vulcanized assembly, and said sealing lip is formed in said process of vulcanization, so as to protrude radially outwardly from an outer circumferential surface of said metallic sleeve.

19. A fluid-filled vibration-damping device according to claim 13, wherein said first mounting member, said elastic body and said metallic sleeve cooperate to provide an integral vulcanized assembly, and said sealing lip is located radially outwardly of said metallic sleeve, by radially inwardly drawing said metallic sleeve to give said elastic body a given amount of radially inward pre-compression, for protruding said sealing lips radially outwardly relative to said metallic sleeve.

20. A fluid-filled vibration-damping device according to claim 17, wherein said generally cylindrical orifice member is mounted onto said integral vulcanized assembly such that said metallic sleeve of said integral vulcanized assembly is inserted into a bore of said generally cylindrical orifice member from a side of said small diameter annular portion thereof.

* * * * *